United States Patent [19]

Sato et al.

[11] 4,325,086

[45] Apr. 13, 1982

[54] RECORDING DEVICE

[75] Inventors: Yasushi Sato, Kawasaki; Seiji Saito; Naoki Ayata, both of Yokohama, all of Japan

[73] Assignee: Canon Kabushiki Kaisha, Tokyo, Japan

[21] Appl. No.: 139,762

[22] Filed: Apr. 14, 1980

[30] Foreign Application Priority Data

| Apr. 20, 1979 | [JP] | Japan | 54-48656 |
| Jun. 14, 1979 | [JP] | Japan | 54-74797 |
| Jun. 20, 1979 | [JP] | Japan | 54-77801 |
| Jul. 13, 1979 | [JP] | Japan | 54-89111 |
| Jul. 16, 1979 | [JP] | Japan | 54-91153 |

[51] Int. Cl.³ .............................................. H04N 1/22
[52] U.S. Cl. ........................... 358/296; 340/146.3 H; 358/264; 358/280; 358/285; 358/291; 358/294
[58] Field of Search ............... 358/285, 291, 280, 264, 358/294, 296; 340/146.3 H; 346/134, 138

[56] References Cited

U.S. PATENT DOCUMENTS

| 4,054,884 | 10/1977 | Nelson | 346/138 |
| 4,121,245 | 10/1978 | Hibbard | 340/146.3 H |
| 4,158,835 | 6/1979 | Miura | 340/146.3 H |
| 4,205,350 | 5/1980 | Gunning | 358/285 |

*Primary Examiner*—Howard Britton
*Attorney, Agent, or Firm*—Fitzpatrick, Cella, Harper & Scinto

[57] ABSTRACT

A recording device capable of performing recording of information at any desired position on the recording medium with extreme easiness, which comprises an original mounting device to mount thereon an image original to be reproduced, a detecting device to detect a position of the original on the original mounting device, and a control device to control the recording position of the recording information onto the recording medium in response to the position of the original detected by the detecting device.

20 Claims, 20 Drawing Figures

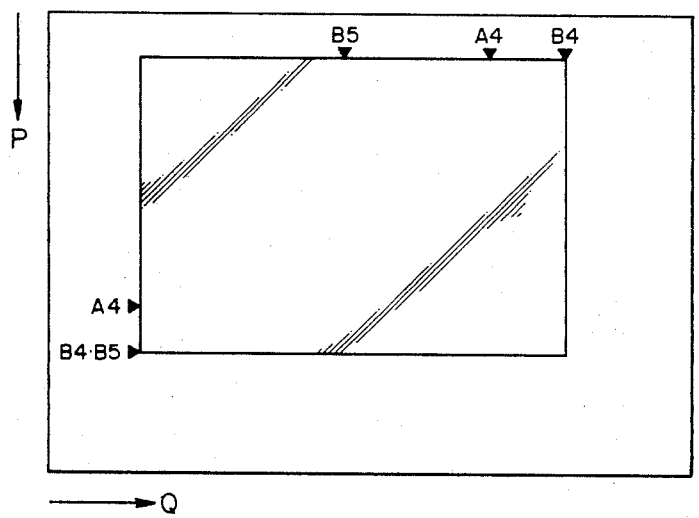
FIG. 1
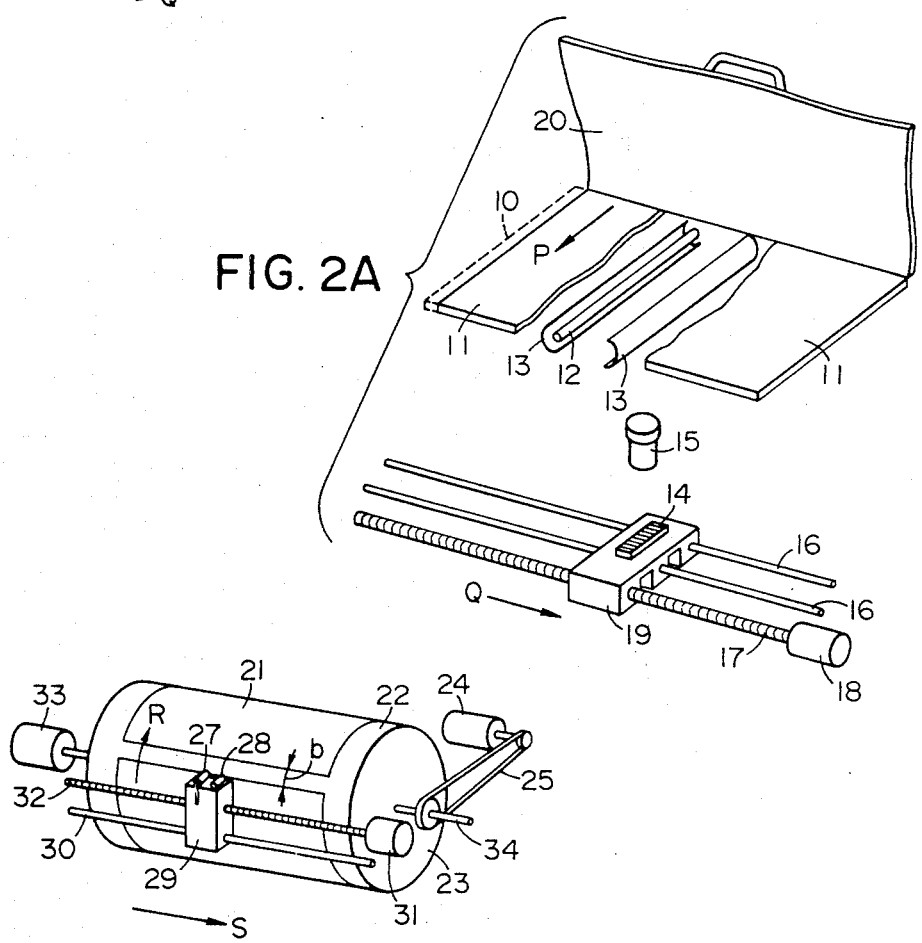
FIG. 2A
FIG. 2B

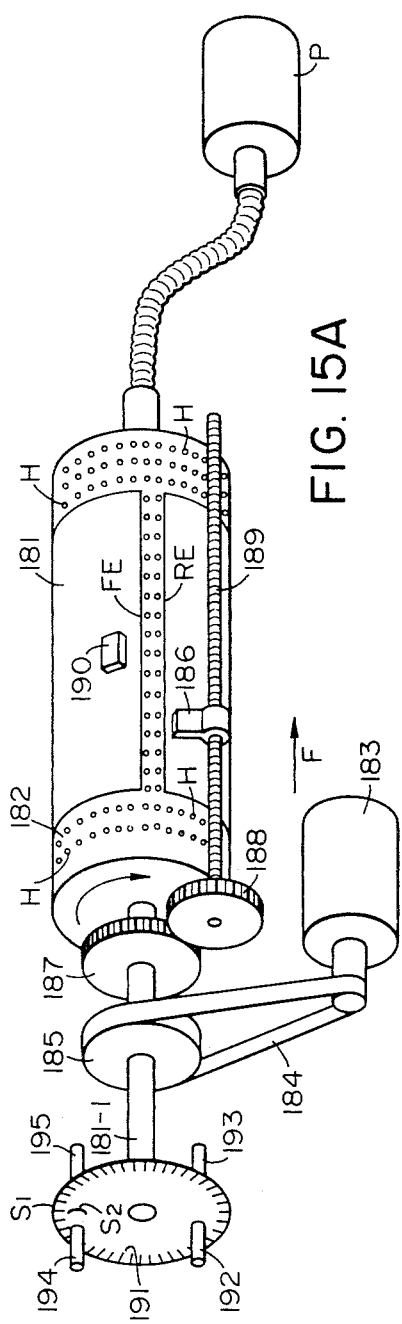
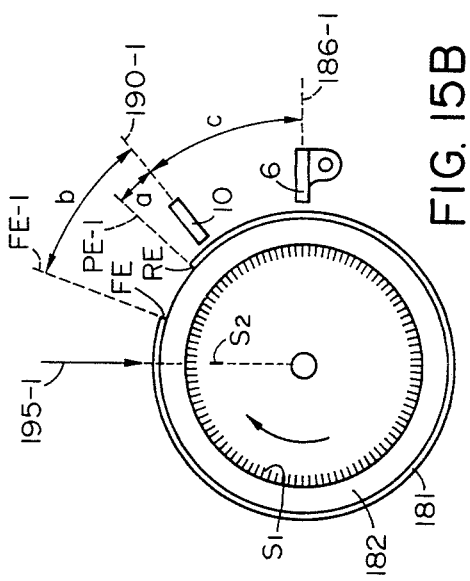
FIG. 15A
FIG. 15B

RECORDING DEVICE

BACKGROUND OF THE INVENTION

1. Field of the Invention

This invention relates to a recording device, and, more particularly, it is concerned with such recording device that is able to perform information recording with due accuracy and at any desired position on a recording medium.

2. Description of the Prior Arts

Recording devices, which have so far been known, all perform recording of informations at a definitely fixed position on a recording medium, hence it has been difficult to control the recording position. Moreover, a recording device which records information obtained from an original is to record the information at such position on the recording medium that corresponds to the mounted position of the original, hence control of the information recording position onto the recording medium first necessitates selection of an original mounting location in the recording device. In a reproductive recording device which has ordinarily been used, the original mounting location is designated on the original mounting table according to the size of the original. Therefore, unless the original is placed on the original mounting table at the time of reproduction following the size designation, no accurate information recording can be effected on the recording medium. As another example, when books and magazines are used for reproduction, and reproduced copies are to be filed in binders, the information at the left side margin of the copies is eliminated due to perforations for filing. In order to remove such disadvantage, operators must place the original on the original mounting table by making an allowance for an estimated marginal space where the perforations are made. It is, however, troublesome to place the original with an advance estimation for the marginal space, which is time-consuming and requires care. In addition, when a book, etc. is to be reproduced, if such original cannot be placed so that it protrudes from the original mounting table (such as in the case where the original pressing device is cumbersome, or in the case of a reproduction apparatus of a type, in which the original mounting table is moved), the book should be mounted upside down at every time the opposite page is to be reproduced (e.g., from left page to right page, or vice versa), so that there arises such inconvenience that the shifting direction of the original should be made opposite between the left page and the right page for securing the margin.

SUMMARY OF THE INVENTION

It is therefore a primary object of the present invention to provide a recording device capable of performing recording of information at any desired position on the recording medium with extreme simplicity.

It is another object of the present invention to provide a recording device capable of accurately recording information in the original onto the recording medium, even if the original is mounted at any arbitrary position on the original mounting table.

It is still another object of the present invention to provide a recording device capable of forming a desired marginal space on the recording medium.

It is yet another object of the present invention to provide a recording device capable of varying the marginal space to be formed on the recording medium in accordance with the nature of the recording operation, when a plurality of recordings different in size are to be effected.

BRIEF DESCRIPTION OF THE DRAWINGS

FIG. 1 is a plan view of an original mounting table of a recording device with designated sizes of the recording medium being indicated thereon;

FIGS. 2A and 2B are perspective views of the recording device according to the present invention;

FIGS. 15A and 15B are respectively a perspective view and a side elevational view of another embodiment of the recording device of the present invention;

DESCRIPTION OF THE PREFERRED EMBODIMENTS

Figure 3:
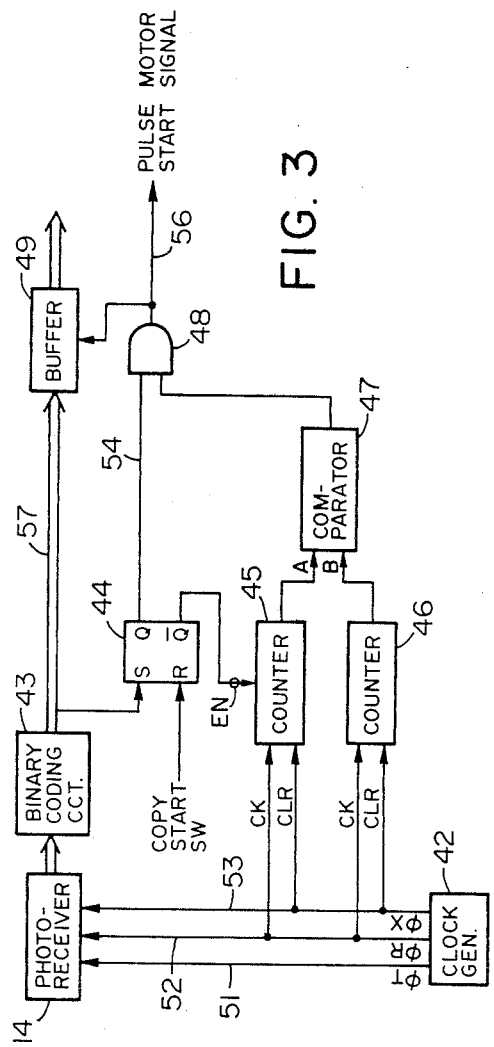
FIG. 3 is a circuit diagram for controlling the recording position in the recording device.

In the following, one embodiment of the present invention will be described in reference to the accompanying drawing.

Referring to FIGS. 2A and 2B, the recording device, according to the present invention consists of an information reading section for reading information in an original as shown in FIG. 2A, and a recording section for recording the information on a recording medium as shown in FIG. 2B.

An original mounting table 11 made of glass or the like material is formed on the top part of the reading section, as shown in FIG. 2A, onto which an original is placed. Over the top of this original mounting table 11, there is provided a shield 20 for covering the and fixing the original in position. In this embodiment, the surface of the shield 20 facing the original on the table is colored black, unlike the ordinary shield, so as to absorb light and to detect the position of the original on the table.

Below the original mounting table 11, there is provided an optical unit consisting of a rod-shaped light source 12 for illuminating the original, a reflecting mirror 13 which is so provided that the light emitted from the light source 12 may effectively irradiate the original mounting table 11, a light receiving device 14, in which a multitude of light receiving elements are linearly disposed, and an optical lens 15 to form image information in the original onto this light receiving device 14. The optical unit is integrally constructed by a supporting member (not shown), and is fixed onto a base mount 19. The base mount 19 is slidably provided on a pair of guide rails 16, 16 which extend in the direction perpendicular to the abovementioned linearly arranged light receiving elements. It forwardly moves in the direction Q or backwardly moves in the direction opposite to the direction Q by means of a rod screw 17 which rotates by the driving force of a motor 18. Also, the principal scanning direction of the light receiving device 14 is in the direction P in FIG. 2A on the original surface, sequentially and repetitively. Accordingly, by the movement (or auxiliary scanning) of the optical unit, the informations in the original placed on the original mounting table 11 are sequentially focussed on the light receiving device 14, and, when the light receiving elements are sequentially read out (or subjected to principal scanning), there can be obtained sequential image element signals from the light receiving device 14 as the result of the raster scanning. In short, the optical information on the original is sequentially read out in terms of the image element unit.

In the embodiment as described above, the original mounting table 11 is fixed and the optical unit shifts. Inversely, however, a construction, in which the optical unit is fixed and the original mounting table 11 is shiftable, can also be adopted.

In the following, explanations will be given as to the recording section in reference to FIG. 2B. A recording paper 21 is held on a cylindrical drum 22 having a multitude of through-holes (not shown) in the peripheral part thereof by rendering the inner pressure of the drum to be lower than the atmospheric pressure. A pulley 23 is provided at one end of a rotational shaft 34 of the drum 22 so as to rotate the drum in the direction R by a pulley belt 25 extended between the pulley 23 and a motor 24. The recording (or principal scanning) head such as, for example, an ink jet head 27, is mounted on a head supporting member 29 together with a paper detector 28 for detecting the end of the recording paper wound around the drum 22. The paper detector 28 to be used may be a combination of, for example, a light emitting element and a light receiving element (e.g., a photo-interruptor). The head supporting member 29 is provided on a guide rail 30 in a freely slidable manner, and moves reciprocally in the direction S or opposite thereto by means of a rod screw 32 which rotates by driving force of a motor 31. For prevention of pairing, jittering, etc. in the image as recorded, it is preferable that the motor 31 rotates in synchronism with rotation of the drum 22, for which purpose it should preferably be driven by one and the same clock source as that of the motor 24. Or, it may also be feasible to transmit drive power to the rod screw 32 from the rotating drum 22 by mechanical means such as gears, belts, etc. At the other end of the rotational shaft 34 of the drum 22, there is connected a rotary encoder 33, by an output of which rotational angle of the drum 22 is detected for synchronizing the printing timing of the ink jet. It is also feasible to use the output pulse from this rotary encoder 33 as the drive pulse for the above-mentioned motor 31 (which is a pulse motor).

In the case of performing the reproductive recording by the device shown in FIGS. 2A and 2B, the information in the original placed on the orignal mounting table is subjected to repetitive raster scanning in the direction P, while the base mount 19 of the optical unit is moving in the direction Q. In this instance, the recording section records on the recording paper the image information for one scan line as subjected to the raster scanning during one rotation of the drum which rotates in the direction R. Also, the head supporting member 29, while it is moving in the direction S, performs the recording operation in synchronism with the base mount 19 of the optical unit which moves in the direction Q. In other words, the direction P of the reading section and the direction R of the recording section, and the direction Q of the reading section and the direction S of the recording section, respectively correspond with each other. In this case, the image informations obtained at the reading section are sent to the ink jet 27 of the recording section through a buffer circuit, and the recording is effected in conjunction with the reading, although it may also be feasible to file in the memory the page informations which have once been read, after which they are recorded separately.

In the afore-described recording device, the light receiving device 19 can detect the position of the original wherever it may be placed on the original mounting table 11, and the recording onto the recording paper can be commenced from the thus detected position, although it is still necessary to place the original in parallel with the edge of the original mounting table. For the position of the original image to be detected, the light receiving device 14 should be able to distinguish the original image from the shield of the original mounting table, for which purpose the shield 20 for the original mounting table 20 is colored black as mentioned in the foregoing. The light receiving device 14 is composed of a multitude of light receiving elements which convert light inputs into electrical signals, and are capable of processing these signals time-sequentially. One example of such a light receivng element is a "CCD" (Charge Coupling Device). In the device of FIG. 2, if the maximum size of the recording paper for reproduction is made A-3 size as shown in FIG. 1, the width of the original mounting table (in the direction P of FIG. 2A) should be 297 mm. In contrast to this, if a linear sensor of 2048 bits, for example, is used as the light receiving device 14, an image resolution of seven image elements/mm can be obtained. When much higher image resolution is necessary, a plurality of lenses and light receiving devices may be arranged. At any rate, the light receiving device 14 should be so provided that it may detect the entire width of the original mounting table 11.

FIG. 3 shows an outline of the original detecting circuit to be applied to the recording device as mentioned in the foregoing. In the drawing, a drive clock is given to the light receiving device 14 from a clock generator 42. Take a CCD sensor as an example, it becomes necessary to provide a shift clock ($\phi$T) of the shift register on a signal line 51, a reset clock ($\phi$R) of an output amplifier on a signal line 52, a start pulse ($\phi$X) to control an accumulating time on a signal line 53 (provided that the shift register section in CCD is two), and so forth. It should be noted here that the reset clock $\phi$R has the same frequency as that of a video signal which is an image element output, and the pulse $\phi$X has the same scanning time as that of one scan line. The video signal of the light receiving device 14 is digitalized by a digitalizing circuit 43 to become a data signal. In the ordinary case, however, it is quantized by a quantization circuit using a comparator. Now, if a dark level showing a blackened portion in the original image is made correspondent to a low level in the quantized value, and a bright level showing a white portion in the original to a high level in the quantized value, signals corresponding to the dark and bright portions in the original are transferred to a buffer circuit 49, and connected to a set terminal S of a set-reset flipflop 44. A copy start signal is connected to a reset terminal R of the flipflip 44, which is reset when the copy start switch is depressed and the optical unit starts moving. Accordingly, an output terminal Q of the flipflop 44 produces a low level output until a high level signal is applied to the set terminal S, i.e., until the original is detected. It is to be understood here that the original generally contains a surrounding white portion. On the other hand, the reset clock $\phi R$ and the start pulse $\phi X$ of the clock generator 42 are applied to a clock input terminal CK and a clear input terminal CLR in counters 45, 46, respectively. These counters are capable of counting more than the number of the light receiving elements of the light receiving device 14 (e.g. 2048), by which bit number of the video signal is counted for every one scan line. Of the two counters, the counter 46 always counts the reset clock $\phi R$, while the counter 45 counts the bit number of the scanning line until the original is detected, because an enable terminal EN is connected with an output $\bar{Q}$ of the flipflop 44. The counted values are then held in the flipflop 44 until a subsequent copy start signal is applied thereto. The outputs from the counters 45, 46 are connected with a digital comparator 47 which, it is understand, produces a high level output to a signal line 55 only when the output from the counter 46 is greater than that from the counter 45. Therefore, a signal on signal line 54 of the flipflop 44 assumes the high level when the light detector 14 detects the original, while the optical unit is in movement. On the other hand, the output on the signal line 55 of the comparator 47 assumes the high level from a time when it has reached a bit equal to the position of the original for each scan line after detection of the original. Accordingly, an "AND" gate 48 produces a high level output only when the light detecting device is scanning the original. Thus, by using the enable signal on the signal line 56 of the "AND" gate 48 as a starting signal for starting driving of an ink jet head forwarding motor (a numeral 31 in FIG. 2B), or by using an output data of the digitalizing circuit 43 as a control signal for starting the operation of a buffer 49 for forwarding the output data to the ink jet, the ink jet recording in commenced after detection of the original.

Figure 4:
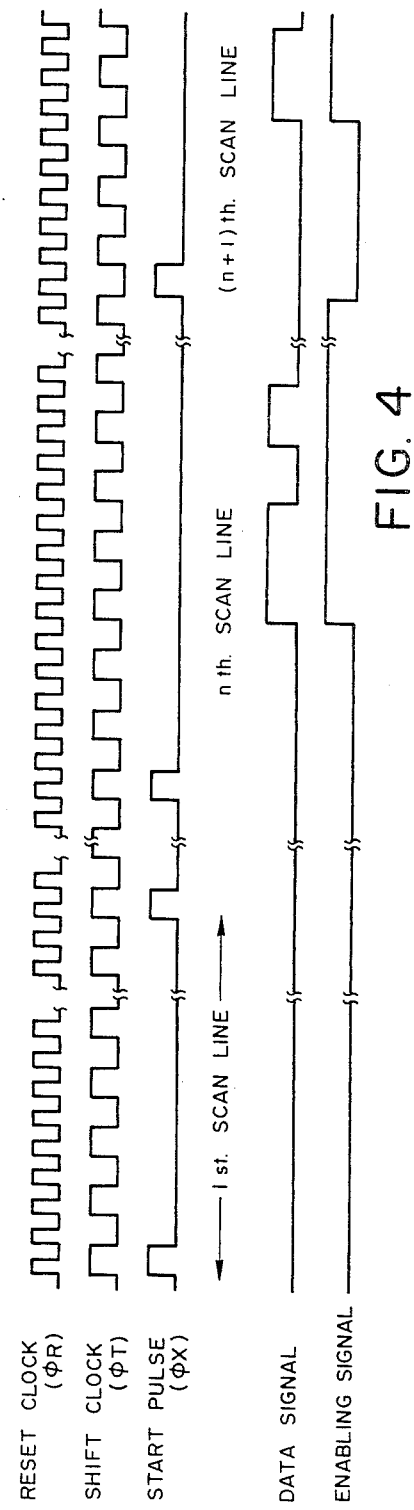
FIG. 4 indicates various signal waveforms for explaining the operation of the recording position control circuit shown in FIG. 3.

Explaining what have been described in the foregoing in reference to the timing charts in FIG. 4, the reset clock $\phi R$ corresponds to the bit of the image information, e.g., the start pulse $\phi X$ is generated for every 2048 bits. The shift clock $\phi T$ is such that it transfers the information in the shift register with a frequency half as that of the reset clock R when two shift register sections are provided. The data signals led out on a signal line 57 are such that quantize the video signals in CCD and subject them to sampling and holding between one bit, in which the white level in the original corresponds to the high level. Assume now that the optical unit moves, and the light receiving device 14 starts reading the information of the original on the original mounting table, whereby the data signal assumes the high level at the n'th scan line. From this time on, the enable signal to be led out on the signal line 56 assumes the high level, and the recording is commenced. By this enable signal, the head forwarding motor 31 of the recording section is started, and the output from the digitalization circuit 43 begins to be applied to the ink jet 27 through the buffer 49. Since the counter 46 is cleared by the start pulse $\phi X$ at every one scanning, the enable signal assumes the low level when one scanning operation terminates.

As stated in the foregoing, according to this embodiment, the original on the original mounting table is detected, and the recording is commenced from the position where the original has been detected, so that there accrues remarkable advantage of performing accurate reproduction, even when the original is placed at any arbitrary position on the image mounting table.

Incidentally, in the above-described embodiment, an explanations has been made as to a case wherein an ink jet is used as the recording section. However, any other appropriate means such as thermal recording, electrostatic recording, laser beam recording, and other digital recording may be adopted.

The afore-described embodiment relates to a recording device of a type, in which the record start condition is rendered as soon as the original is detected. As another embodiment, FIG. 5 illustrates a schematic control circuit for arbitrarily setting a recording position of information on a recording paper.

Figure 5:
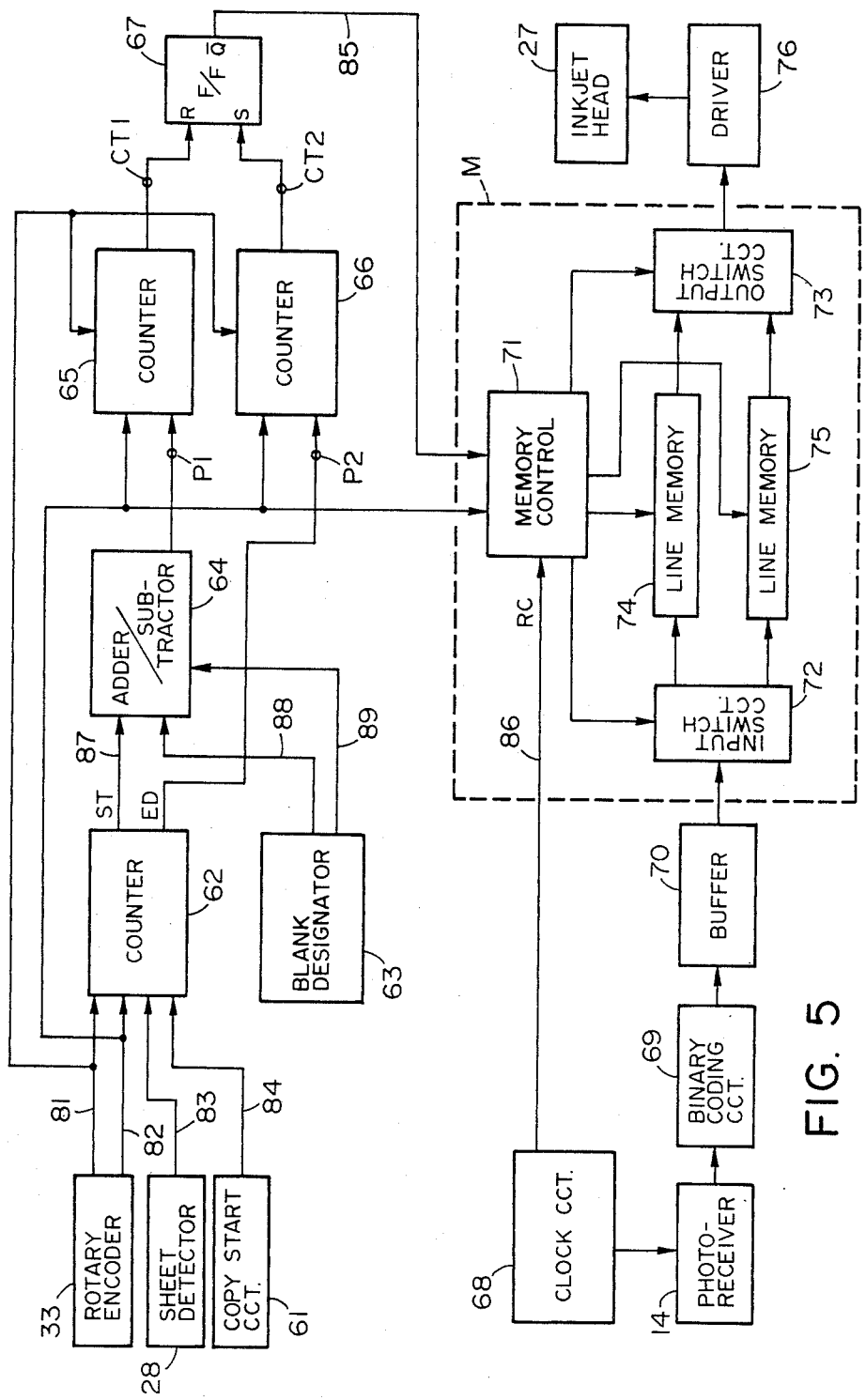
FIG. 5 is another embodiment of the recording position control circuit according to the present invention.

Explaining the operation of the circuit in FIG. 5, a differential counter circuit 62 performs its counting operation on the basis of a reference signal which is led out by one rotation of the rotary encoder and an output pulse from the paper detector 28, i.e., it counts a phase difference of a zero signal 81 with a clock signal 82 of the rotary encoder. This is for replacing a signal from the paper detector 28 which detects the front and rear ends of the recording paper 21 wound around the drum 22 with the clock signal 82 of the rotary encoder 82. This counting operation is done during one rotation of the drum prior to the start of the copying operation, after which both front and rear ends of the paper are all determined by an output from the rotary encoder 33 during recording of one sheet of paper. Accordingly, the differential counting circuit 62 continues its operation during a time period required for one rotation of the drum 22, when a copy start signal 84 is generated from a copy start circuit 61. In the course of its operation, intervals between the zero signal 81 and the starting and terminating ends are counted by use of the starting and terminating ends of the paper detected by the zero signal 81 of the rotary encoder 33 and the paper detector 28.

Figure 6:
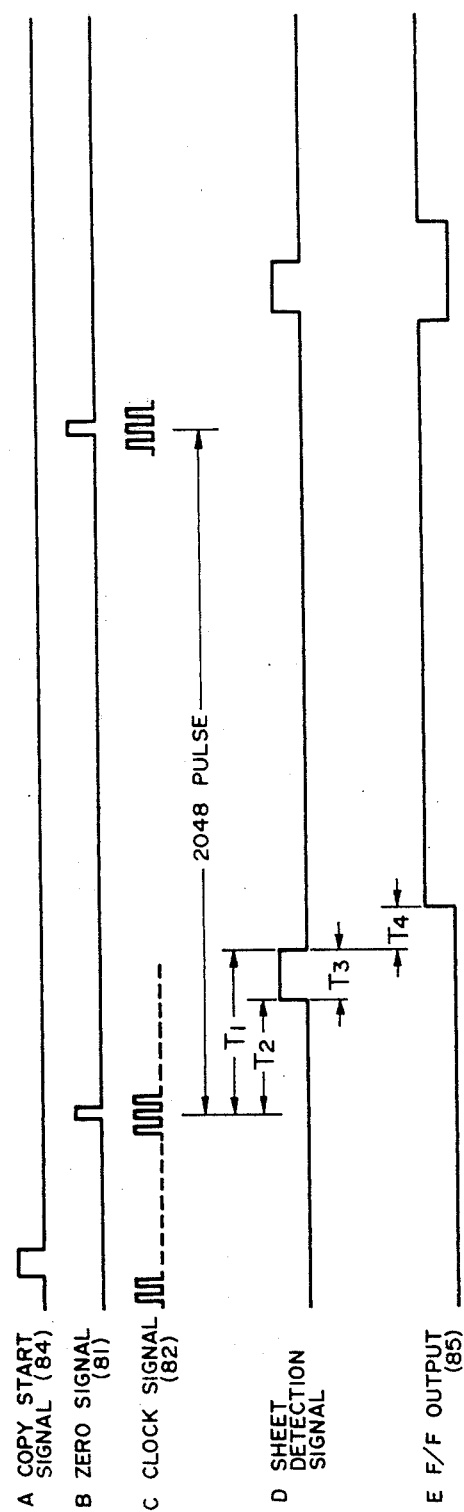
FIG. 6 indicates various signal waveforms for explaining the operation of the recording position control circuit shown in FIG. 5.

Explaining the above-described operations in reference to the timing chart in FIG. 6, the zero signal 81 is a pulse signal which is generated once during one rotation of the rotary encoder 33, i.e., during one rotation of the drum 22. During this one cycle, the rotary encoder 33, e.g., the clock signal 82 (FIG. 6C) generates 2048 pulses. On the other hand, the paper detector 28 provided on the head supporting member 29 detects a difference in the reflected light between the recording paper 21 and the drum 22, and produces a low level output signal for the recording paper and a high level output signal for the drum on the signal line 83. As shown in FIG. 6D, while the paper detection signal (T3 in FIG. 6D) is at the high level, a section b on the drum in FIG. 2B is being detected. The differential counter circuit 62 counts an interval $T_1$ between the zero signal 81 and the front end of the recording paper with the clock signal 82 of the rotary encoder as the reference clock to thereby produce an output ST on the signal line 87. It also counts an interval $T_2$ between the zero signal and the terminating end of the recording paper to produce an output ED on the signal line. A margin designating circuit 63 is capable of setting an arbitrary digital number, and is for instructing whether the set number is to be added or subtracted. The digital number is led out on the signal line 88, and the instruction signal is led out on the signal line 89.

An addition and subtraction circuit 64 is capable of performing addition and subtraction operations of 12 bits, and, based on the output ST from the abovementioned differential counter circuit 62 and the number set by the margin designating circuit 63, the operational results are produced as outputs to a preset input terminal P1 of the counter 65. On the other hand, the output ED of the differential counter circuit 62 is connected to a preset input terminal P2 of the counter 66, as it is. The counters 65 and 66 are 2048-bit counters. An input clock is a clock signal from the rotary encoder 33. The zero signal of the rotary encoder 33 is used as a load signal for the preset value. The counters 65, 66 also have carry terminals CT1, CT2 for leading out a carry output of 2048 bits. In the case of the counter 65, the carry output CT1 is generated when the paper detector 28 reaches a position corresponding to a number obtained by addition or subtraction of a number set in the margin designating circuit to and from the output ST corresponding to the position at the front end of the recording paper. In the case of the counter 66, the carry output CT2 is generated when the paper detector 28 reaches a position corresponding to the rear end of the recording paper. These carry outputs are respectively connected with a reset terminal R and a set terminal S of a set/reset flipflip 67. A signal as shown in FIG. 6E is produced as an output at an output terminal $\bar{Q}$ of this flipflop 67. As will be seen from FIG. 6E, the signal on the output terminal $\bar{Q}$ is at the high level after the time delay of T4 from the front end of the paper, and becomes low level at the rear end of the paper. By using this signal as the enable signal to the ink jet head, and also by varying the time T4 by changing the set value in the margin designating circuit 63, the recording start position on the recording paper can be arbitrarily selected.

Explaining briefly the control mechanisms for the reading and recording sections in reference to FIG. 5, the light receiving device 14 is composed of, for example, a CCD sensor, to which shaft clock, reset clock, start clock, etc. are imparted at the clock circuit 68. The video output of the CCD sensor constituting the light receiving device 14 is transferrd to a memory portion M through a quantization circuit 69 and a buffer circuit 70. The memory portion M consists of an input switch circuit 72, an output switch circuit 73, two line memories 74, 75, and memory control circuit 71 to control these memories. Each of the line memories 74, 75 is a memory of 2048 bits, and is so controlled by the memory control circuit 71 that, when one of them is in the input mode, the other may be in the output mode. In correspondence to this, the input switch circuit 72 is so selected that input data may be introduced into the line memory in the input mode. Similarly, the output switch circuit 73 is so selected that data in the line memory in the output mode may be produced as output. Input operation is done by taking synchronism with a reset clock RC of the CCD on the signal line 86 with respect to the input memory, while the output operation is performed by synchronization with the clock signal 82 of the rotary encoder with respect to the output memory. Further, the output timing of the output memory is controlled by an output on the signal line 85 of the flipflop 67. The output image information from the output line memory controls the ink jet drive circuit 76 to perform the recording with the ink jet head 27 in accordance with the image information.

In the following, one embodiment of the margin designating circuit 63 will be explained in reference to FIG. 7. The margin designating circuit 63 is a circuit to digitally generate a shift quantity corresponding to a marginal space. The quantity is determined by a shift quantity setting device 91 consisting of a variable resistor, etc. shown in FIG. 7. In the embodiment, an input voltage to be introduced by the shift quantity setting device 91 into an AD converter 95 varies. The AD converter 95 is to convert the input into, for example, a digital signal of 8 bits, hence the maximum shifting of 32 mm is possible with a reproduction and recording device having an image resolution of 8 image elements/mm. In this example, construction is such that the digital signal of 8 bits is connected with the 8-bit in the addition and subtraction circuit 64 of 12 bits from its lower bit (LSB). However, when the circuit is constructed as such (i.e., from the bit 1 to the bit 8), the shifting is theoretically possible in a unit of 1 bit=0.125 mm. Since such high precision is not practically required, if this output is connected with the bit 8 from the bit 5 of the addition and subtraction circuit 64 by use of the AD converter of 4 bits, the shifting can be done up to 32 mm with 2 mm interval, and, moreover, the AD converter of 4 bits capacity will suffice for such purpose. When a larger shifting quantity is desired, an AD converter having a longer number of bits may be used, or the output of the AD converter may be connected to a higher bit number in the addition and subtraction circuit. The change-over switch 97 is, for example, an analog switch which is changed over by a signal from the margin shift switch 90. When the margin shift switch 90 is depressed, an output from the AD converter 95 is supplied to the addition and subtraction circuit 64 through the signal line 88. When no margin shift switch 90 is depressed, the change-over switch 97 is so changed over that a digital zero may be applied to the addition and subtraction circuit 64 from the zero signal generator 96 through the signal line 88. The addition and subtraction circuit 64 is applied with addition and subtraction designating signals through the signal line 89, besides it is applied with the shift quantity informations from the margin designating circuit 63 through the signal line 88. The reason for this is that, in case a book may only be moved parallel on the image mounting table, when both right and left pages of the book are to be copied, only the addition will suffice; however, in case the book must be made up-side-down every time the left and right pages are to be reproduced, there arises the necessity that not only a marginal space be provided at the front end of the recording paper (left page), but also it must be provided at the rear end thereof, in which case the subtraction operation is necessary. For the abovementioned reason, the circuit in the illustrated embodiment is so constructed that designation of the addition and subtraction is done by the addition and subtraction circuit 64.

Instruction for the addition and subtraction can be done by rendering the signal line 89 to be at the high level (addition) or low level (subtraction). In the device where the addition and subtraction are necessary, the flipflop 94 is provided so that a signal may be inverted every time the copy switch 92 is depressed. In this case, it must first be instructed from which page the copying should start, right or left. This is done by selecting the left page start switch 98 and the right page start switch 99. When the left page start switch 98 is on, a change-over switch 100 is so selected as to obtaining an output Q of the flipflop 94. When the right page start switch 99 is on, the change-over switch 100 is so selected as to obtaining an output $\bar{Q}$ of the flipflop 94. When either of the left page start switch 98 or the right page start switch 99 has been selected, an output from an AND gate 101 assumes a low level, and a change-over switch 102 applies an output from the flipflop 94 to the addition and subtraction circuit 64 (it is understood that the switches 98, 99 are respectively in "on" state at the low signal level, and "off" state at the high signal level). Next, when the clear switch 93 is depressed to render the flipflop 94 to be in a cleared state (Q=low level) (this clear switch may be depressed before pushing the right and left page start switch), and then the copy start switch 92 is depressed, a high level signal (addition instruction) is transmitted to the addition and subtraction circuit 64 through the signal line 89 in case the left page start switch 98 is on, while a low level signal (subtraction instruction is transmitted to the circuit in case the right page start switch 99 is on. Thereafter, every time the copy start switch 92 is depressed, this signal 89 is inverted. In case neither the left page start switch 98 nor the right page start switch 99 is depressed (or, in case there is no necessity for the book to be made upside-down at every time its left and right pages are reproduced), an output from the AND gate 101 is at the high signal level, and the change-over switch 102 selects the power source voltage 103 to constantly produce an output addition instruction.

The foregoing explanations are for a case, wherein originals in A-4 and B-4 sizes are copied on a recording paper in A-4 size using the original mounting table shown in FIG. 1.

In the following, explanation will be given as to a case wherein a book in B-5 size is copied on a recording paper in B-5 size using the original mounting table in FIG. 1. In this case, the mounting direction of the original is opposite to the previous case, wherein its lengthwise direction and the breadthwise direction are just opposite by 90° shifting. In the case of providing a marginal space, the start timings of the light receiving device 14 and the supporting member 29 may be controlled, not by delaying each scanning line. That is, when a copy in B-5 size is made using the original mounting table shown in FIG. 1, if it is desired to provide a marginal space at the left side of the recording paper, the head supporting member 29 is shifted first, while, if it is desired to provide a marginal space at the right side of the paper, the light receiving device may be shifted first. One embodiment to realize this is shown in FIG. 8. The operation of this circuit is as follows: when the copy start switch 111 is depressed, a reference signal generated by this switch depression and a delay signal which is generated later than this reference signal are respectively used for a start signal of the base mount 19 of the light receiving device 19 and a start signal of the supporting member 29 of the ink jet head 27, thereby controlling the start timings of the base mount 19 and the supporting member 29. Which of the base mount 19 and the supporting member 29 should be started first will be determined in accordance with whether the left page start switch 120 is first turned on, or the right page start switch 121 is first turned on, as in the embodiment in FIG. 7. When the left page start switch 120 is on, an output Q from the flipflop 122 is selected by the change-over switch 123. When the right page start switch 121 is on, an output $\bar{Q}$ is selected by the switch. When either of the left page start switch 120 or the right page start switch 121 has been selected, an output from the AND gate 125 assumes a low level, and the change-over switch 126 produces an output from the change-over switch 123, i.e., an output from the flipflop 122 (a reference numeral 119 designates a switch to generate a clear signal to clear the flipflop 122), to a control terminal 131 of a polarity inverting circuit 118. On the other hand, the shifting quantity can be arbitrarily changed by a shift quantity setting device 112 consisting of a variable resistor. This shift quantity setting device 112 is connected to a delay circuit 113 consisting, for example, of a monostable multivibrator. As a resistor to determine a time constant of this oscillation, the abovementioned shift quantity setting device 112 is used. Now, when a margin shifting is necessary, the margin shift switch 110 is depressed, whereupon the change-over switch 115 selects an outputs from the delay circuit 113 and transmits a delay signal to a set terminal S of the set/reset flipflop 116. Further, a copy start signal to be a reference signal is directly applied to the set terminal S of the second set/reset flipflop 117. These two set/reset flipflops 116, 117 are reset by a stop signal from a copy stop signal generator 114. This copy stop signal is one that is produced by a detector, e.g., a photo-interruptor or a hole element, etc. (not shown), provided at a return position of either or both of the head supporting member 29 and the optical unit base mount 19.

On the other hand, the outputs Q from the flipflops 116, 117 are respectively connected to input teminals 127, 128 of the polarity inverting circuit 118. The polarity inverting circuit 118 is a bipolar two-way switch which functions to determine depending on the signal level at the control terminal thereof whether the input terminal 127 and the output terminal 129 as well as the input terminal 128 and the output terminal 130 are connected (at the time of the high signal level at the control terminal 131), or the input terminal 127 and the output terminal 130 as well as the input terminal 128 and the output terminal 129 are to be connected (at the time of the low signal level at the control terminal 131).

Now, in case the left page start switch 120 is in its on state, when the copy start switch 111 is depressed, the change-over switch 126 is connected to the output Q of the flipflop 122, i.e., a high signal level is applied to the control terminal 131. In this state, the polarity inverting circuit 118 connects an output from the delay circuit 113 with the output terminal 129 through the input terminal 127, and connects the reference signal with the output terminal 130 through the input terminal 128. Since the output terminals 129 and 130 are respectively used as the optical unit base mount start signal and the head supporting member start signal, the head supporting member starts ahead of the optical unit base mount, in this case, whereby a marginal space is provided at the left end of the recording paper. A reverse of this will appear when the right page start switch 121 is depressed. Thereafter, every time the copy start switch 111 is depressed, the polarity inverting circuit 118 is changed over, whereby the advancing relationship in start between the optical unit base mount and the head supporting member is alternately reversed.

Figure 7:
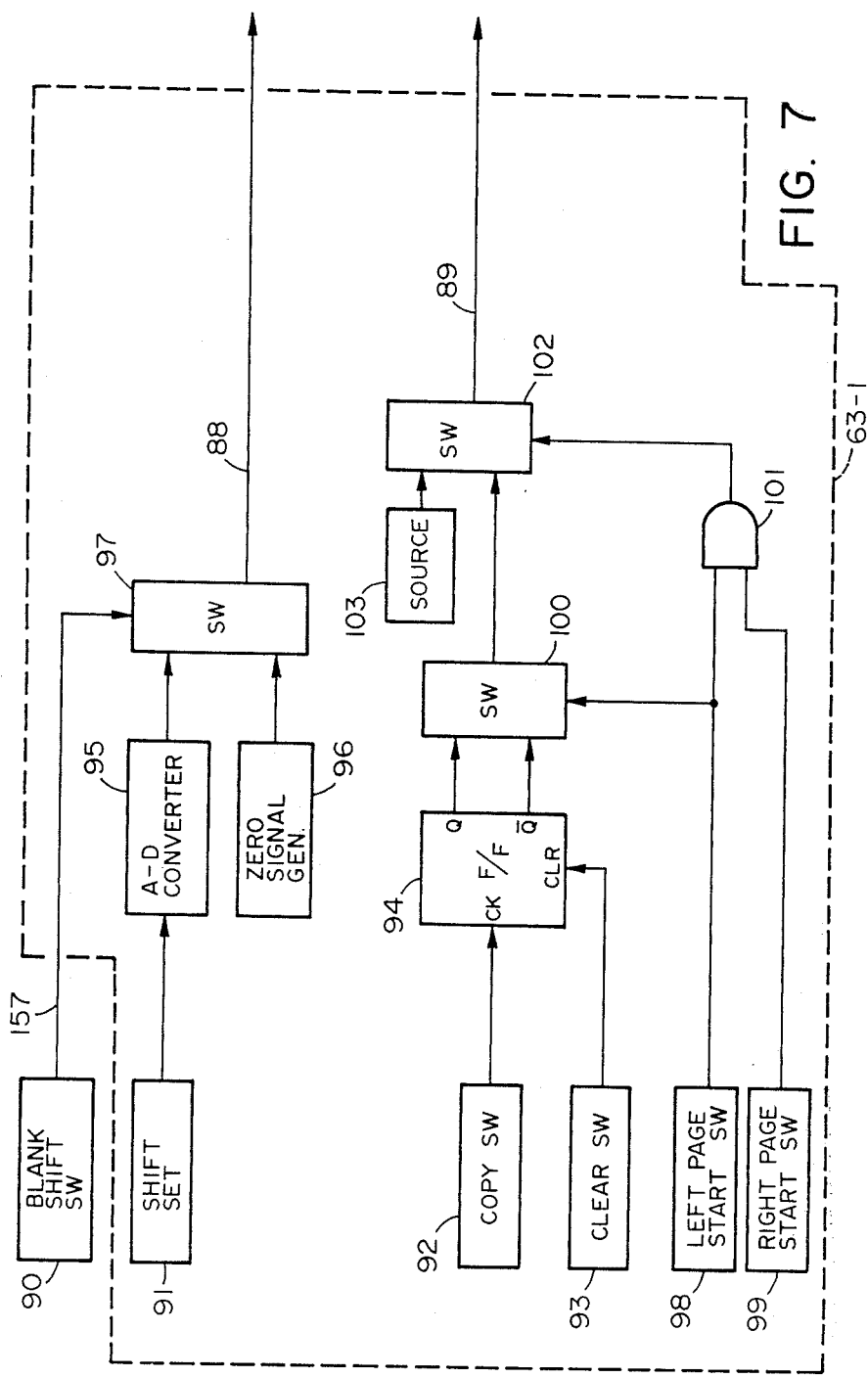
FIGS. 7 and 8 are respectively the main parts of the recording position control circuit shown in FIG. 5.
Figure 8:
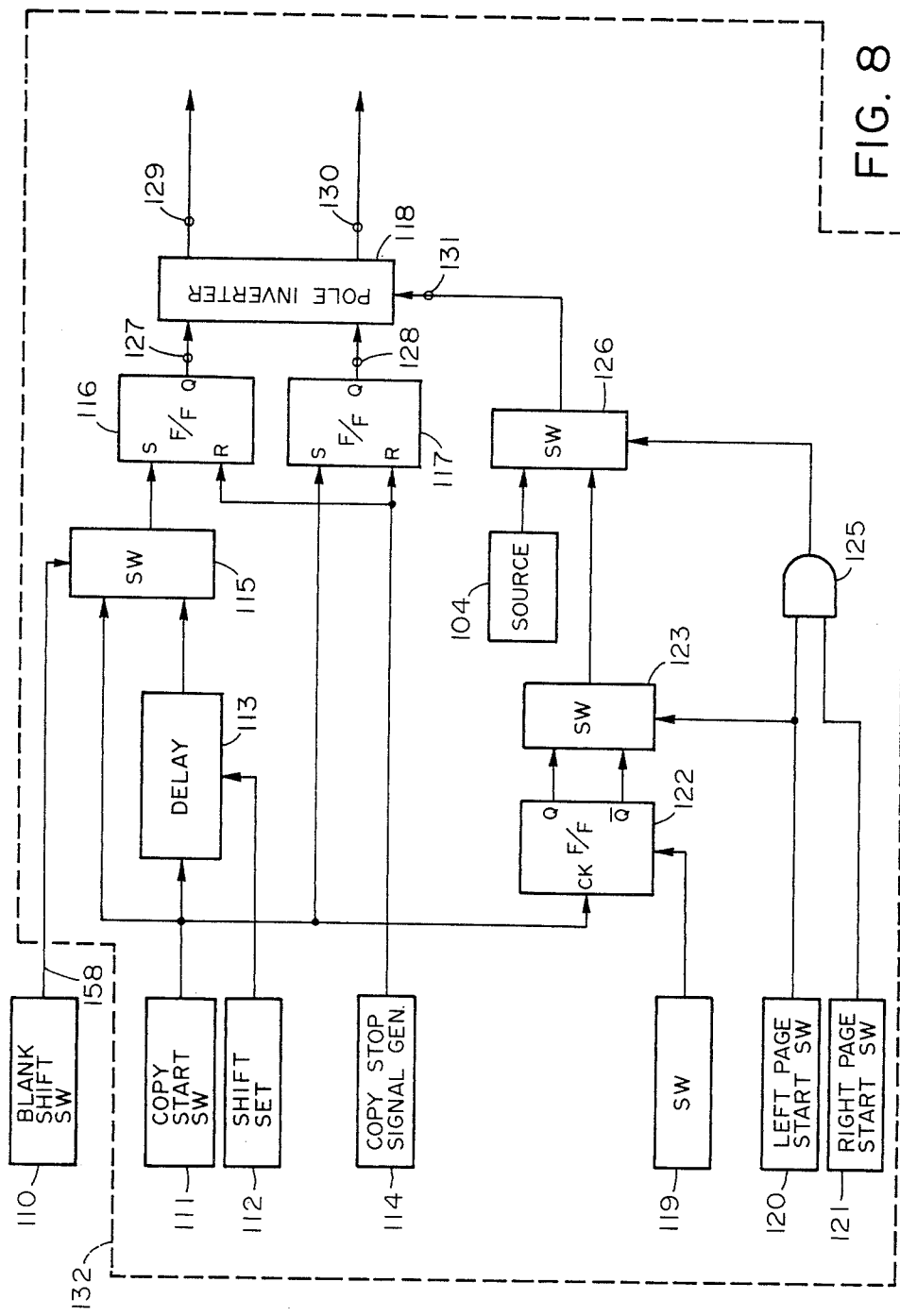

The foregoing explanations are with regard to the case wherein a book should be placed up-side-down for copying its left and right pages, same as in the FIG. 7 embodiment. In the case of a reproduction material or a reproduction apparatus which does not require such reverse positioning, there is no necessity for depressing either switches 120, 121, so that the output from the AND gate 125 assumes the high level, the change-over switch 126 selects the source voltage 124, and the control terminal 131 constantly maintains its high signal level irrespective of the number of times of depression of the copy start switch 111. In this consequence, the marginal space can always be secured at the left end of the recording paper. When no margin shifting is required, the margin shift switch 100 is in its "off" state, and the change-over switch 115 transmits a signal of the copy start switch 111 to the flipflop 116 as it is, whereby the optical unit base mount and the head supporting member start simultaneously.

In the foregoing, explanations have been made of the embodiment, wherein the recording paper in B-4 and A-4 sizes are used (FIG. 7), and the embodiment, wherein the recording paper in B-5 size is used (FIG. 8), both using the original mounting table in FIG. 1. A circuit which is capable of automatically selecting these two circuits in accordance with a copy size signal is shown in FIG. 9.

Figure 9:
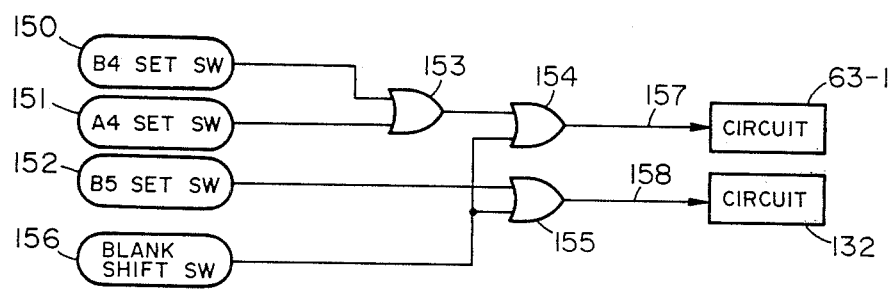
FIG. 9 is a circuit diagram for size designation switches for the recording medium.

The circuit shown in FIG. 9 is to select either a designating switch 150 for copy paper in B-4 size, or a designating switch 151 for copy paper in A-4 size, or a designating switch 152 for a copy paper in B-5 size. It also functions to select, upon depression of the margin shift switch 90, either the circuit in FIG. 7 or the circuit in FIG. 8 in accordance with the size of the copy paper. In more detail, when any one of the switches 150 and 151 is in its "on" state (the output being at the low level), the OR gate 155 assumes the low signal level. At this time, since the margin shift switch 156 is in its "on" state, i.e., at the low signal level, the OR gate 154 emits a low signal level output. In this instant, since the switch 152 is at the high signal level, the output from the OR gate 155 is also at the high signal level. The output from the OR gate 154 is connected with the circuit 63-1 through the signal line 157, while the output from the OR gate 155 is connected with the circuit 132 through the signal line 158. Accordingly, when copying B-4 or A-4 size paper, the circuit in FIG. 7 is selected. Inversely, when copying the B-5 size paper, the circuit in FIG. 8 is seleced. Further, when the margin shift switch 156 is in its "off" state, either outputs from the OR gates 154, 155 assume the high signal level, whereby both circuits in FIGS. 7 and 8 do not perform the margin shifting.

As stated in the foregoing, according to the embodiment shown in FIG. 9, any one of the two kinds of margin shifting methods as shown in FIGS. 7 and 8 can be automatically selected by the copy size selection. The margin shifting quantity setting devices 91, 112 can also be used, as they are, as the copy start switches 92, 111, clear switches 93, 119, left page start switches 98, 120, and right page start switches 99, 121, by properly selecting a circuit constant.

As stated in the foregoing, the present invention makes it possible to automatically provide an arbitrary amount of marginal space on the recording paper. Incidentally, in the above-described embodiments, only those examples of using the ink jet recording technique in its recording section have been shown, although various other recording techniques such as the thermal recording technique capable of performing the digital recording, the electrostatic recording, laser beam recording, and so forth can be employed.

In the above-described embodiments, there are used a light source for illuminating the original and an optical lens for reading the information on the original. With these components, it occurs from time to time that electrical signals formed from those optical informations lose their accuracy due to shading of the optical lens system, irregularity in sensitivity of the light receiving device, and irregularity in luminance of the light source in the reading device. These disadvantages can be successfully removed by another embodiment of the present invention to be described hereinbelow.

A reference image original 10 such as, for example, the one as shown in FIG. 2, is placed on the original mounting table 11. The original is placed at such a position that, when the self-scanning type light receiving device 14 is at its home position, this reference original may be projected just onto this self-scanning type light receiving device. As will be mentioned later, this reference original is for correcting the shading, sensitivity irregularity in the light receiving device, changes in luminance of the light source by means of illumination distribution on its surface. Therefore, this original should always be protected from staining. Also, to be detailed at a later paragraph, while the reference original may either be white or an intermediate tone (such as grey, etc.), it should preferably have a uniform density over its entire surface.

In the device shown in FIG. 2, if an optical system having a scale reduction rate of 1/7.5 is formed using a lens 15 having a focal length of 32 mm, its half angle of view is approximately 22.5 degrees. In this instance, the illumination distribution in the direction P on the light receiving device 14, i.e., an output voltage distribution when the light receiving device 14 is scanned, is represented by a curve (a) in FIG. 10 in accordance with the rule of the fourth power of cosine.

The light information output from the light receiving device 14 has so far been considered as an analog signal. Now considering the case of digitallizing the same, the output should be subjected to the digitallization process. For the sake of simplicity, if it is assumed that the information is subjected to quantization for black and white, a slice level as shown in a dash line (b) in FIG. 10 should be established. As will be understood from the graphical representation, since the illumination lowers at the peripheral part of the image surface, there arises such apprehension that the white level would be mistaken for the black level.

In order to rectify this shading phenomenon in the reproduction apparatus, facsimile, etc., the embodiment according to the present invention is first to record the informations such as the shading, sensitivity irregularity, light source liminance, etc. in a memory device by previously reading the reference original by the self-scanning type light detector prior to commencement of reading the original, than reads out the stored values in synchronism with the output from the self-scanning type light detector at the time of reading the original, and digitalizes the values by comparing them with a video signal. This embodiment will be explained in more detail in the following in reference to FIG. 3.

Figure 11:
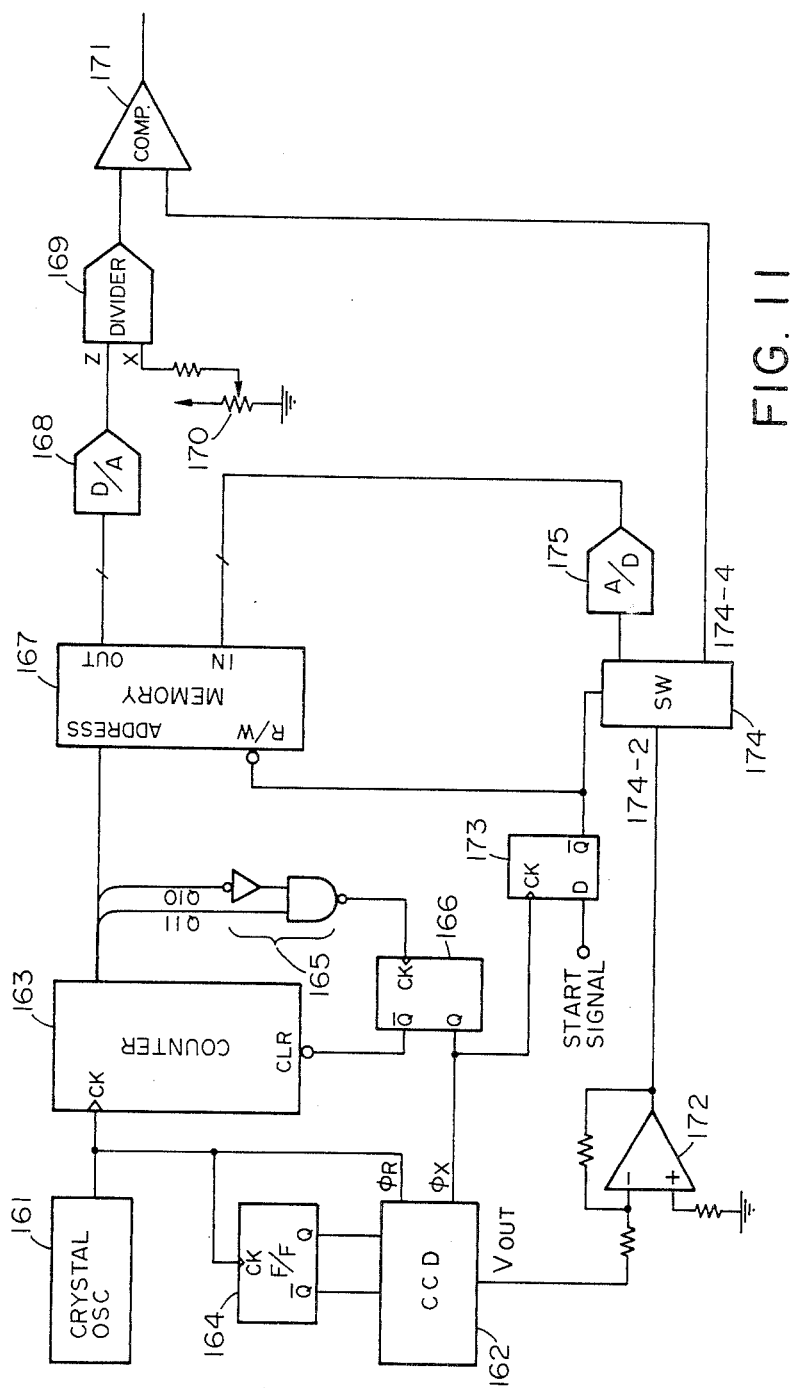
FIGS. 11 through 14 show various embodiments of the control circuits for removing the irregularity in the luminance.

In FIG. 11, a quartz oscillator 161 is for producing a reference clock which controls a CCD image sensor 162 and a memory 167. The CCD image sensor 162 is a linear sensor of 2048 bits. For the clocks to be imparted to this CCD image sensor, there are, for example, a reset clock φR of the output amplifier, two-phase shift clocks φ1, φ2 of the shift register, a start pulse φX for starting the line scanning, and others. For the reset clock φR, a reference clock of the quartz oscillator 161 is used. The shift clocks 100₁, φ₂ are obtained by producing the reference clock with the flipflop 164. The start pulse φX is given by first counting the reset clock φR by a counter 163 of 11 bits, and, after detecting 2048 through the gate 165, shaping the same in an appropriate pulse width by the one-shot multi-vibrator 166. At this instant, the counter 163 is also cleared by this start pulse φX. Accordingly, the counter 163 is of 2048 bits. The memory 167 (memory device) utilizes, for example, a bit construction consisting of eight numbers of RAM having 2048 bits (2048 words × 8 bits).

For the means of selecting the address in this memory 167, the bit 11 of an output from the abovementioned 2048-bit counter 163 is connected to an address selecting terminal of the memory 167. Accordingly, when the line scanning of the CCD 162 commences, the memory 167 is selected from the address 1 to the address 2048 in synchronism with the reset clock φR of the CCD 162. It should be noted that the memory 167 is not particularly necessary to be in the 8-bit unit, but it may be in the 4-bit unit (consisting of ic of 256 words × 4 bits × 8) in the case of the black and white quantization as mentioned above. Further, when quantizing into increased number of values, any number of bits required in accordance with the level of the multi-value quantization may be selected.

The memory 167 is RAM as already mentioned above, and is capable of performing both reading and writing operations. The control is done by a read/write terminal (R/W) of the memory 167 which, in turn, is connected with the output $\bar{Q}$ of the D-flipflop 173. To this D-flipflop 173, there are applied the start pulse φX of the CCD 162 as the clock input, and the start signal as the delay input D. The start signal is an instruction signal, by which the self-scanning type light detector in FIG. 1 starts its movement from the home position to the direction Q. This signal is generated from a control section (not shown) in the reading apparatus. It is understood that the pulse width of this start signal is substantially equal to the cycle of the start pulse φX of the CCD 162.

Accordingly, after the start signal has been applied, the D-flipflop 173 produces a low level output signal to the output $\bar{Q}$ for one cycle alone in synchronism with the start pulse φX. In other words, the reference original 1 is read for one scan line prior to movement of the CCD 162, and the value as read is stored in the memory 167. This value is obtained by digitallizing a value in the curve (a) in FIG. 10 with 8 bits. With this value, the shading correction in the optical system, sensitivity irregularity correction in the CCD, luminance irregularity correction in the light source, and so forth can be carried out.

The writing operation into the memory 167 of the illumination distribution of the reference original 10 may be done every time the self-scanning type light detector starts moving from its home position, or it may be done only when the power source of the reading device is turned on. Further, by providing a back-up power source in the memory 167, it becomes possible to maintain the stored contents, even when the power source for the reading device is "off". Furthermore, by use of a non-volatile memory as the memory 167, the writing of the illumination distribution into the memory can be done at an arbitrary time. Accordingly, the reference original 10 is not necessarily provided on the original mounting table 11. An output from the CCD 162 is amplified by the video amplifier 172, and is connected to an input terminal 174-2 of the switch circuit 174. The switch 174 is a single pole two-way analog switch, the control of which is done by the output $\bar{Q}$ of the D-flipflop 173 through the control terminal 174-1. When the control terminal 174-1 is at a low signal level, the input terminal 174-2 is connected with the output terminal 174-3. When the control terminal 174-1 is at the high signal level, it is connected with the output terminal 174-4. That is, when the memory 167 is writing data (writing condition), the signal from the video amplifier 172 is connected with the memory 167. When the memory 167 is reading data (reading condition), the signal is connected with the comparator 171. An analog/digital converter (AD converter) 175 is inserted between the output terminal 174-3 of the switch 174 and the memory 167, and the video signal is digitallized by the AD converter 175 to be introduced as an input into the memory 167. The output data from the memory 167 are again converted to the analog values by the digital/analog converter (DA converter) 168. The bit numbers for the AD and DA converters are equal to one word of the memory. The informations of the reference original as converted by the DA converter are introduced as inputs into a divident input terminal Z of the divider 169. To a divider input terminal X of the dividing device 169, a voltage to be developed in the variable resistor 170 is applied, thereby determining the slice level of the comparator 171. When the slice level is to be changed, the variable resistor 170 may be adjusted. As an example, when the slice level is set at 50%, the divider of the dividing device may be set at 2. An output from the dividing device is connected with one of the input terminals of the comparator 171 to constitute a reference voltage of the slice level, which quantizes an output from the video amplifier 172 applied to the other input terminal of the comparator 171 through the switch 174.

In the foregoing, one embodiment of the present invention has been explained in reference to FIG. 11. In FIG. 11, for example, when an analog memory such as the CCD memory is used as the memory 167, the AD converter 175 and the DA converter 168 become unnecessary.

Figure 12:
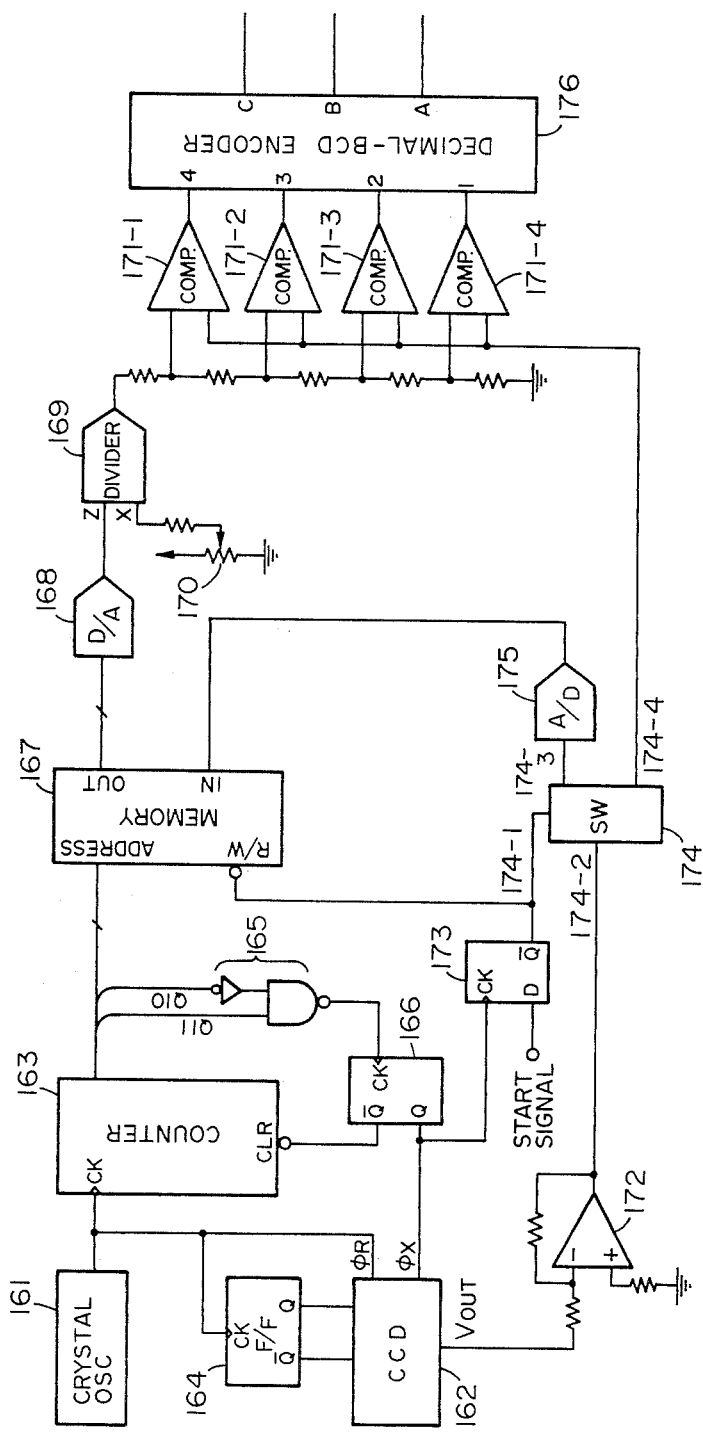

On the other hand, when half tones are required, for which purpose the video signal is to be quantized in multivalue, a plurality of comparators may be provided. An example of four tones is shown in FIG. 12. A reference voltage for the input terminals of the comparators 171-1, 171-2, 171-3 and 171-4 is produced by resistance-division of an output voltage from the dividing device 169 in accordance with the slice level. To the other input terminal, there is applied an output from the video amplifier 172 common to the compararors. Each output from the comparators is introduced as an input into a decimal-BCD encoder 176, whereby an image density converted to a BCD code is obtained.

As one modification of the FIG. 11 embodiment it is also possible to digitalize an output from the video amplifier without AD and DA conversion at the time of input and output operations of the memory 167, and then to quantize the digitalized value with a digital comparator. One example thereof is shown in FIG. 13.

Figure 13:
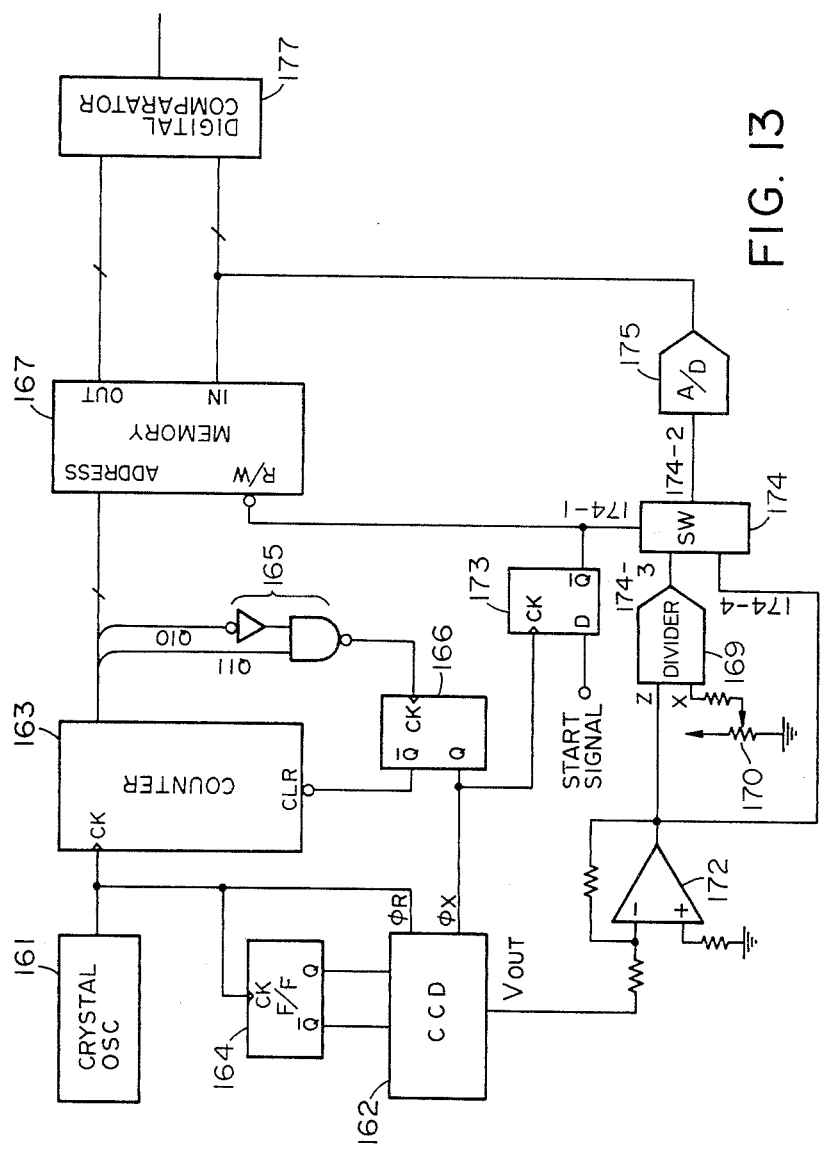

In FIG. 13, one of the outputs from the video amplifier 172 is directly connected to the input terminal 174-4 of the switch 174, and the other is connected with the input terminal 174-3 of the switch 174 through the dividing device 169. The switch 174 selects the side of the dividing device 169 (174-3) when the memory 167 is in the "write" condition, and the output side (174-4) of the video amplifier when it is in the "read" condition so that the selected terminal may be connected with the AD converter 175. After digitalization of the analog values, the AD converter 175 forwards them to the input terminal of the memory 167 and the input terminal of the digital comparator 177. When the memory is in the "write" condition, divided data are written in while, when it is in the "read" condition, the data are introduced into the digital comparator as they are. The digital comparator to be selected has the same bit number as that of one word in the memory.

Figure 10:
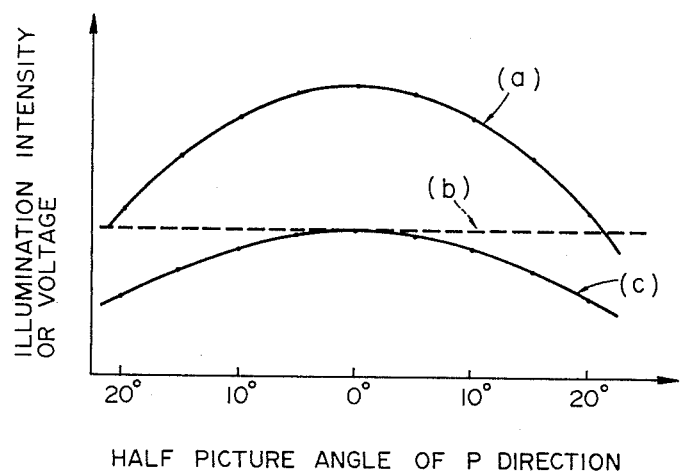
FIG. 10 is a graphical representation showing characteristics of irregularity in luminance.

In the following, an explanation will be given in reference to FIG. 14 as to an example of application, in which the memory 167 can be reduced to a half. This embodiment utilizes the fact that the curve (c) in FIG. 10 is in the axial symmetry with respect to 0°, based on which nature the bits 1 to 1024 are stored in the memory, while, for the bits 1025 to 2048, the data of from 1024th to 1st bits stored in the memory are used. In this case, however, since the memory contents of one and the same address are used twice, it is not possible to correct the sensitivity irregularity of CCD, but only the shading correction.

Figure 14:
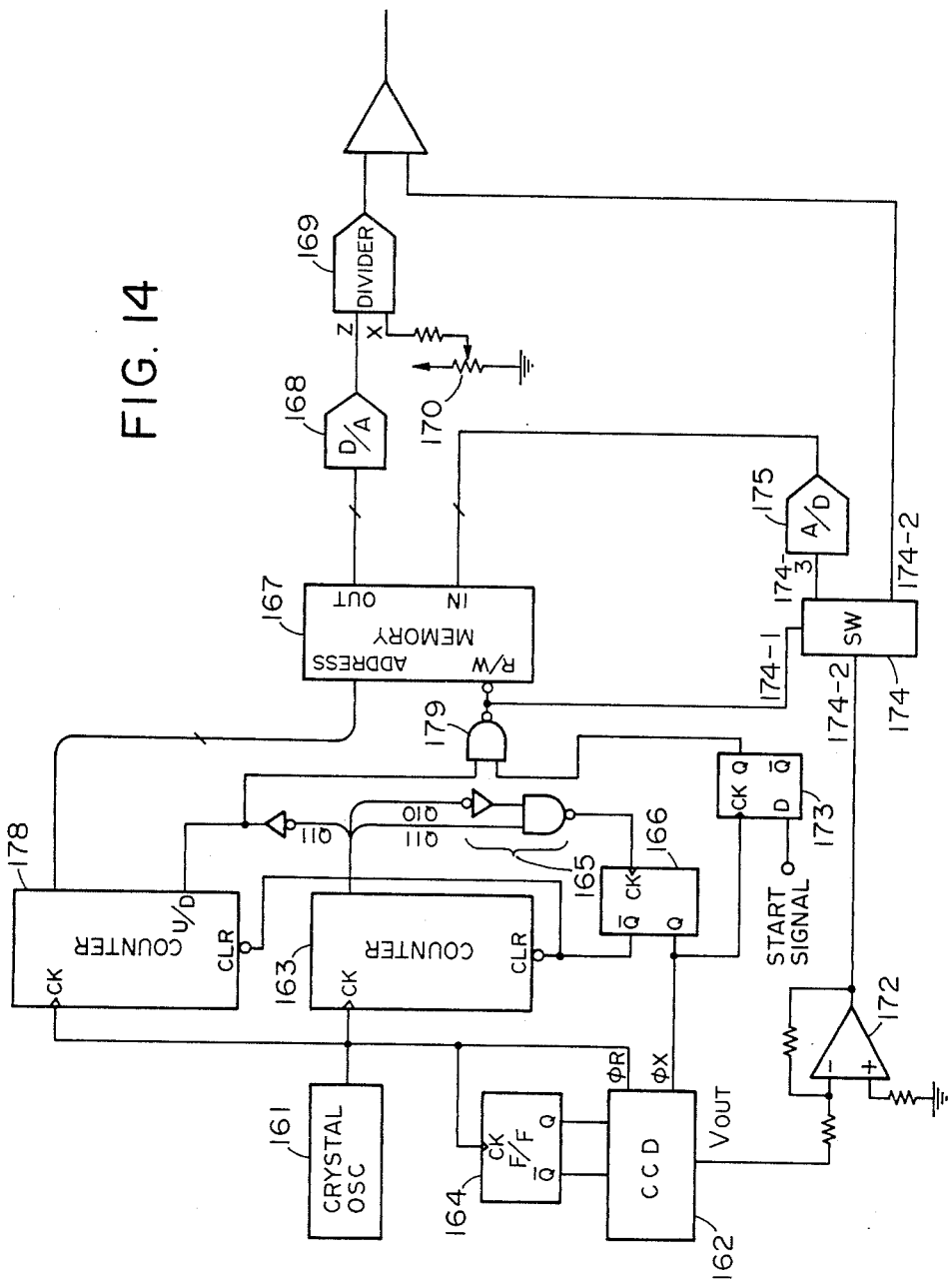

In FIG. 14, a numeral 178 refers to a counter of 10 bits which is characteristically an up-down counter. That is, while it has a function of the up-counter during its counting up to 1024 at the output Q11 of the abovementioned counter 163, it is so controlled as to function as the down-counter thereafter. Accordingly, access can be achieved of the memory of $1024 \times 8$ bits with 10-bit output from this up-down counter 178. In this case, the writing time of the data into the memory 167 may be half the cycle of the aforedescribed example, for the purpose of which the output Q of the D-flipflop and the NAND of the output Q11 of the 11th bit in the counter 163 are reserved in the gate 179.

For another method of saving the memory, one address in the memory may be made to correspond for every plurality of bits in the CCD without causing one address in the memory to correspond to every bit in the CCD. This method is sufficiently practical in case of the two-value level of black and white. For example, considering a case of rectifying every 8 bits, a memory of $256 \times 8$ bits satisfies the purpose. Also, when the method of FIG. 14 is used, the number of memory bits will be further reduced to a half.

In this case, no lower bit of the counter 163 is connected to the address input terminal of the memory 167. For example, if the outputs Q4 to Q11 of the counter 163 are connected to the memory of $256 \times 8$ bits, data for the memory can be selected for every 8 bits. Incidentally, it is to be noted that those members designated by the same reference numerals in each figure of the drawings are composed of the same components.

The foregoing embodiments are all changeable in the slice level. When no slice level needs to be changed, the divider 169 becomes unnecessary. In this case, however, the reference original is not white, but it should be of grey color having a diffusion reflection of about a half that of white.

The foregoing embodiment is concerned with a device, in which a detection signal is formed by detecting the absence of the recording paper, and a marking for the principal scanning is performed in synchronism with this detection signal. However, when such detection signal, which has detected the recording paper, is simply made the synchronous signal, there arises a disadvantage to be mentioned in the following. That is, the end part of the recording paper becomes wavy on the surface of the rotating drum due to suction holes perforated therein to cause irregular paper surface. With such irregular surface the detection signal becomes discrepant. The image which is synchronously recorded with such detection signal shows its straight line in the auxiliary scanning direction to be wavy, which is not favorable.

Therefore, in the following, there will be explained a recording device which is capable of accurately recording the original image on the recording paper.

Referring to FIGS. 15A and 15B, the rotational drum 182 bearing on its peripheral surface the recording paper 181 is subjected to rotation by driving the pulley 185 fixed on the rotational shaft 181-1 through the drive motor 183 and the belt 184. A marking head 186 disposed contiguous to the surface of this rotational drum 182 moves in parallel with the rotational shaft 181-1 by means of gear 187 fixed on the abovementioned rotational shaft 181-1, a gear 188 meshed with the gear 187, and a spiral screw 189 fixed to the gear 188 (auxiliary scanning), and performs recording in accordance with a recording signal applied to the recording paper 181 by application of the recording signal to the head 186 from outside. The paper detector 190 consists of a light emitting element and a light receiving element disposed adjacent to the surface of the rotational drum 182. This paper detector is to discriminate the recording paper 181 from the rotational drum 182, and generate a paper detection signal for carrying out the marking which is synchronized with the ends of the recording paper 181 in the peripheral direction thereof, i.e., the front end FE and the rear end RE. Further, a slit disc 191 is connected to the rotational shaft 181-1 of the rotational drum 182. On this slit disc, there are formed two kinds of slits, i.e., the first slits S1 which finely divide the entire circumference of the disc with an equal space interval, and the second slit S2 singly formed on one circumference. These slits generate rotational pulse signals and a reference pulse signal by means of the light emitting element 192 and the light receiving element 193, and the light emitting element 194 and the light receiving element 195, respectively.

The rotational drum 182 is in a cylindrical shape, in the peripheral surface of which a multitude of holes H are perforated. Interior of the rotational drum 182 is maintained at a negative pressure by sucking air within the rotational drum by means of a suction pump P, whereby the recording paper 181 is attracted on the drum surface due to the negative pressure caused to the paper through the holes. The surface and the inside of the holes H of the drum 182 is painted in non-lustrous black. The detection level of the paper detector 190 is therefore the same between them irrespective of the presence or absence of the holes H, whereby it can be distinguished from the detection level of the recording paper 181. In other words, since the recording paper 181 and the rotational drum 182 have different light reflecting power, presence of the recording paper 181 or the rotational drum 182 at the position opposite the paper detector 190 can be discriminated.

In the present embodiment, as viewed sidewise in FIG. 15B, the position 195-1 where the light emitting element 194 and the light receiving element 195 for generating the reference pulse signal, the position 190-1 where the paper detector 190 is disposed, and the position 186-1 where the marking head 186 is disposed are different.

Explaining in more detail in reference to FIG. 15B, if it is assumed that, when the second slit S2 arrives at the position 195-1, the front end FE and the rear end RE of the recording paper 181 are respectively at the positions FE-1 and RE-1, the number of the rotational pulse signals NFE and NRE to be led out until the front end FE and the rear end RE of the recording paper reach the position 186-1 where the nozzle is disposed become NFE=Nb+Nc and NRE=Na+Nc, respectively. (where: Na denotes a number of rotational pulse signals to be led out until the position RE-1 reaches the position 190-1; Nf denotes a number of rotational pulse signals to be led out until the position FE-1 reaches the position 190-1; and Nc indicates a number of rotational pulse signals to be led out until the position 190-1 reaches the position 186-1). These values take certain definite values depending on the physical positional relationship between the paper detector 190 and the nozzle 186, and, when the positions 190-1 and 186-1 coincide, Nc becomes zero (Nc=0).

In the following, the operations prior to commencement of the recording to the recording paper by the head 186 will be explained.

The head 186 is at a position away from the recording paper 181. The recording paper 181 is fed to the rotational drum 182 by means of a paper feeding means (not shown), and then wound around it. Subsequently, when a paper position setting signal is emitted from the interior or exterior of the recording device, there are performed a counting of the number Na of the rotational pulse signals to be led out until the rear end signal of the paper is obtained after emission of the reference pulse signal, and the number Nb of the rotational pulse signals to be led out until the front end detection signal of the paper is obtained.

As mentioned above, the distance between the position of the paper detector and the position of the head corresponds to the number of the rotational pulse signals in a predetermined value, which is stored in the position correcting memory circuit. Then, by adding the abovementioned numbers Nb and Nc together, or by adding the numbers Na and Nc together, NFE and NRE are stored in the count memory circuit. In this condition, when the preparation for the recording is completed, the recording operation starts, and the reference pulse signal is generated, the numbers of the rotational pulse signals NFE and NRE which have so far been stored in the count memory circuit are read out, converted to a complementary number 1, and preset in the counter. Subsequently, the rotational pulse signals are sequentially applied to the counter as the clock signals. When the number of the rotational pulse signals as applied become equal to the numbers of the rotational pulse signals NFE and NRE, carrier pulses develop to indicate the front and rear ends of the paper. By this carrier signal, there is formed a signal which shows the paper position in synchronism with the drum rotation. By controlling the recording signal with this paper position indicating signal, there can be effected the recording in synchronism with the peripheral direction of the paper.

Figure 16:
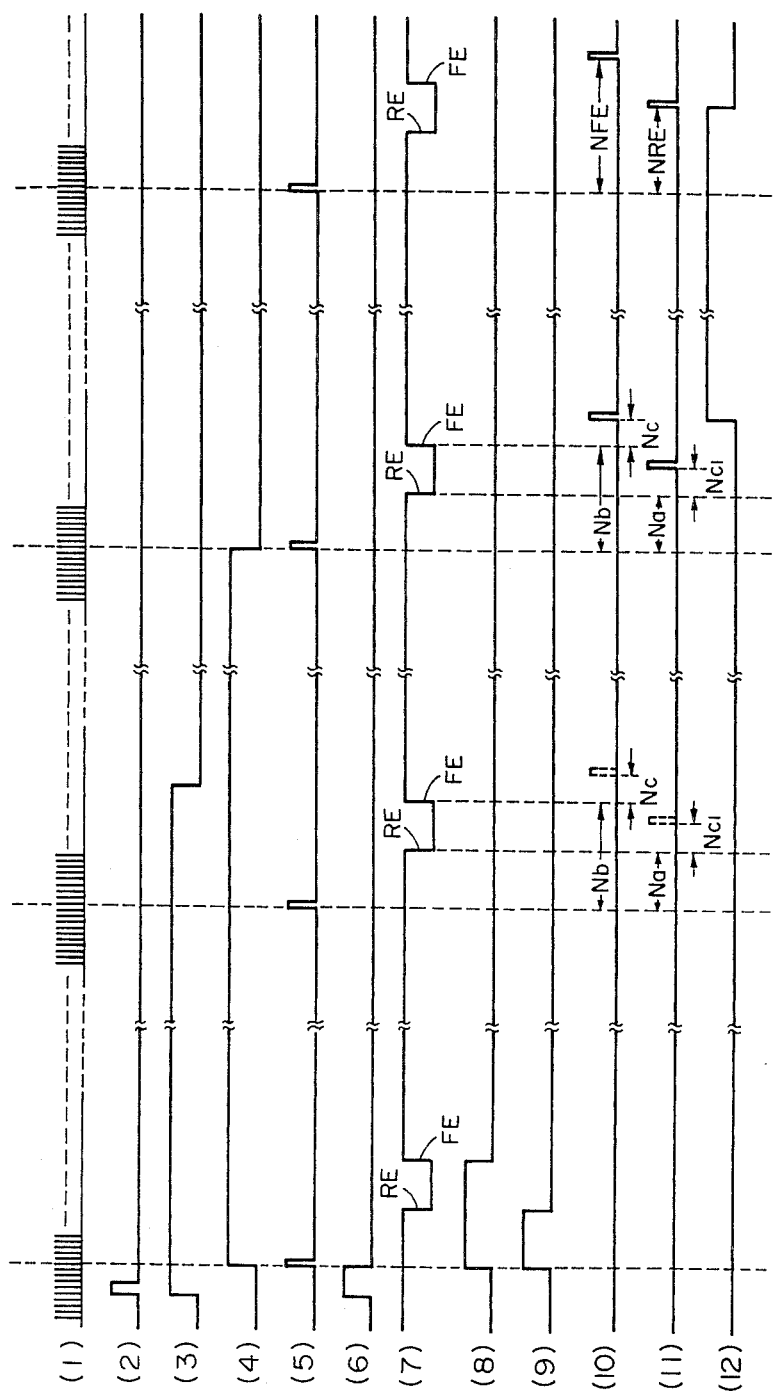
FIG. 16 shows various waveforms for explaining the operation of the recording device shown in FIG. 15.

FIG. 16 shows a timing chart to explain the present invention.

In FIG. 2, the signal (1) denotes the rotational pulse signal, which is led out at least at a space interval corresponding to the image element interval of the original image to be recorded on the recording paper 181, thereby forming the clock signal. When the paper position setting signal (2) is generated from the device inside or outside, it is maintained for at least a time exceeding one cycle (one rotational period) of the rotational drum as shown by (3) in the set signal maintaining circuit. The signal (3) as held produces a set period signal as shown by (4) in synchronism with a reference pulse signal (5). In advance of this set period, a rotational pulse number Nc for correction purpose is loaded in the count memory circuit by a position correcting load signal (6) in advance of the set period. (7) refers to a paper detection signal, in which a high signal level portion denotes a period of paper detection, so that the rising part of the paper detection signal indicates the front end of the paper, and the trailing part the rear end thereof. By the paper detection signal (7) and the abovementioned position correcting load signal (6), there are formed count signals (I), (II) as shown in (8) and (9) in FIG. 16. Accordingly, there are stored in the two count memory circuits the rotational pulse signal numbers Nb and Na corresponding to the periods (8) and (9) from the reference pulse signal to the front end and rear end of the paper, and the abovementioned corrected value Nc, which are counted and added together. This count memory operation is carried out during one rotation of the drum. Accordingly, as shown in FIG. 16(4), when the timing is such that the set period of the set period signal is over two cycles, the set period in the second cycle is neglected. When the set period is terminated, the counted value stored in the count memory device is introduced as an input into the read-out circuit with a timing of the reference pulse signal. In the read-out circuit, the rotational pulse corresponding to the input counted value starting from the reference pulse signal is counted, after which the pulse signals showing the front end and the rear end of the paper are generated as the front end signal (10) and the rear end signal (11). Accordingly, the time instant when these front and rear end signals of the paper are led out coincides with the time instant when the front and rear ends of the paper passes through the position opposite to the nozzle.

Thus, once the time instants for leading out the front end signal and the rear end signal are calculated, these signals are repeatedly used in the recording operation thereafter. The dot-lined pulse in FIG. 16(10) and (11) denotes that the position setting ends at the first cycle, and the operations in the read-out circuit starts in the set period of the second cycle, but, since the cycle corresponds to the set period of the set period signal, the signal is gated, and both front end and rear end signal outputs are produced after termination of the set period. The record synchronous signal is produced by the thus generated front end signal and the rear end signal.

Figure 17:
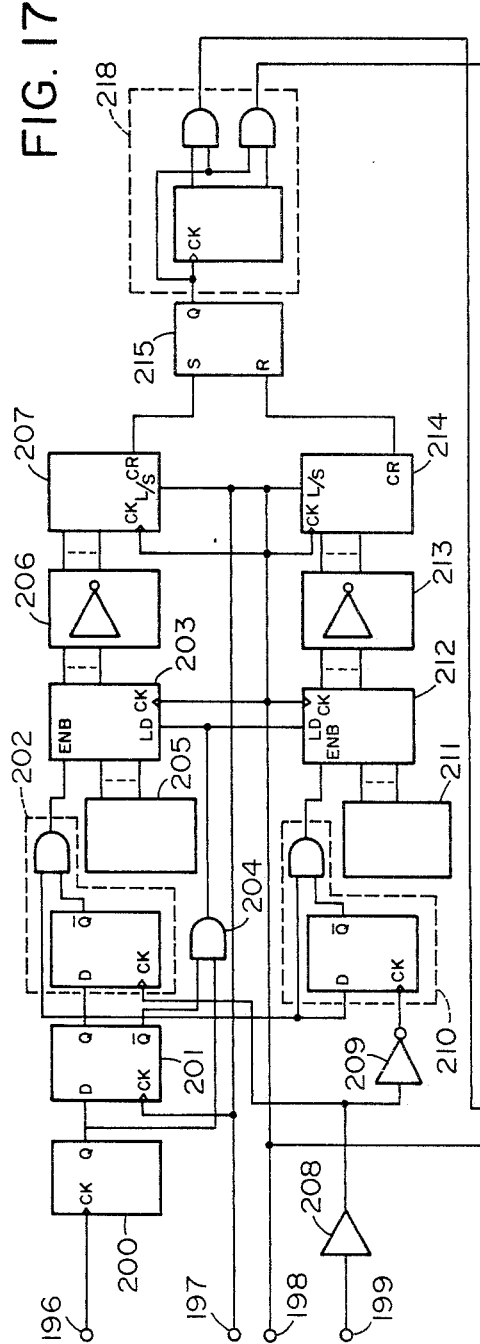
FIG. 17 is a circuit diagram of the recording device shown in FIG. 15.

FIG. 17 is a schematic circuit diagram, in which the present invention has been incorporated. In the drawing, 196 refers to an input terminal for the position setting signal shown in FIG. 16(2). 200 refers to the signal holding circuit to form the hold signal as shown in FIG. 17(3) by holding the position setting signal input for at least one drum cycle, which, according to the embodiment, is formed with a mono/multi vibrator. Terminals 197, 198, and 199 are respectively for introducing the reference pulse signal shown in FIG. 16(5), the rotational pulse signal shown in FIG. 16(1), and the paper detection signal shown in FIG. 16(7). The hold signal formed by holding the position setting signal input in the signal holding circuit 200 is triggered by the reference pulse signal in the set period circuit 201 consisting of D-type flipflop to be formed into the set period signal shown in FIG. 16(4). A count gate signal 1 FIG. 16(10) from the reference pulse signal to the front end of the paper is produced by the count clock gate circuit 202 consisting of the flipflop and the AND gate, during which the rotational pulse signal input is introduced into the count memory circuit 203. On the other hand, in advance of the counting operation, the corrected value Nc is introduced as an input into the count memory circuit 203 from the position correction memory circuit 205 by the position correcting load signal circuit 204 consisting of the AND gate. Accordingly, there is stored in the count memory circuit 203 the value NFE obtained by adding to the corrected value Nc the rotational pulse signal Nb of a number corresponding to the gate period of the count gate signal. The trigger signal input to be introduced into 2 of the count gate circuit is an edge trigger of the paper detection signal shaped by the waveform shaping circuit 208. The counted value which means the front end position of the paper as memorized in the count memory circuit 203 is inverted by the inverter circuit 206 for producing a complementary number of 1, and then introduced as an input into the read-out circuit 207 with a timing of the reference pulse signal. The read-out circuit 207 consist of a presettable counter, and introduces thereinto the counted value in the form of a complementary number at every time the reference pulse signal input is introduced. Thereafter, the rotational pulse signal constitutes a clock to perform the counter operation, and to produce an output signal when the counter has become full. This is an output signal obtained by counting the reference signal input for the counted value, which constitutes the front end signal as shown in FIG. 16(10). Same operation is done with respect to the rear end. In order to produce the same rising edge, the count clock gate circuit 210 is triggered with the edge of the shaped paper detection signal as inverted by the inverter circuit 209. The corrected value Nc1 stored in the rear end position correcting memory circuit 211 is usually less than the corrected value Nc of the position correcting memory circuit 205. This is for preventing the rotational drum 2 from staining by terminating the record operation earlier than the rear end of the recording paper. Accordingly, the rear end correcting memory circuit 211 may be constructed with a circuit to lead out a value obtained by subtracting a certain value from the corrected value Nc stored in the front end correcting memory circuit. The rear end count memory circuit 212, the inverter circuit 213 to form the complementary number, and the read-out circuit 214 are the same as those already explained with respect to the paper front end. However, since a relationship of Nc1<Nc has been established, the rear end signal is led out before the rear end of the paper reaches a position opposite to the nozzle. The front end signal and the rear end signal thus obtained are applied to the synchronous circuit 215 consisting of the RS flipflop to thereby form a synchronous signal for the recording.

Figure 18:
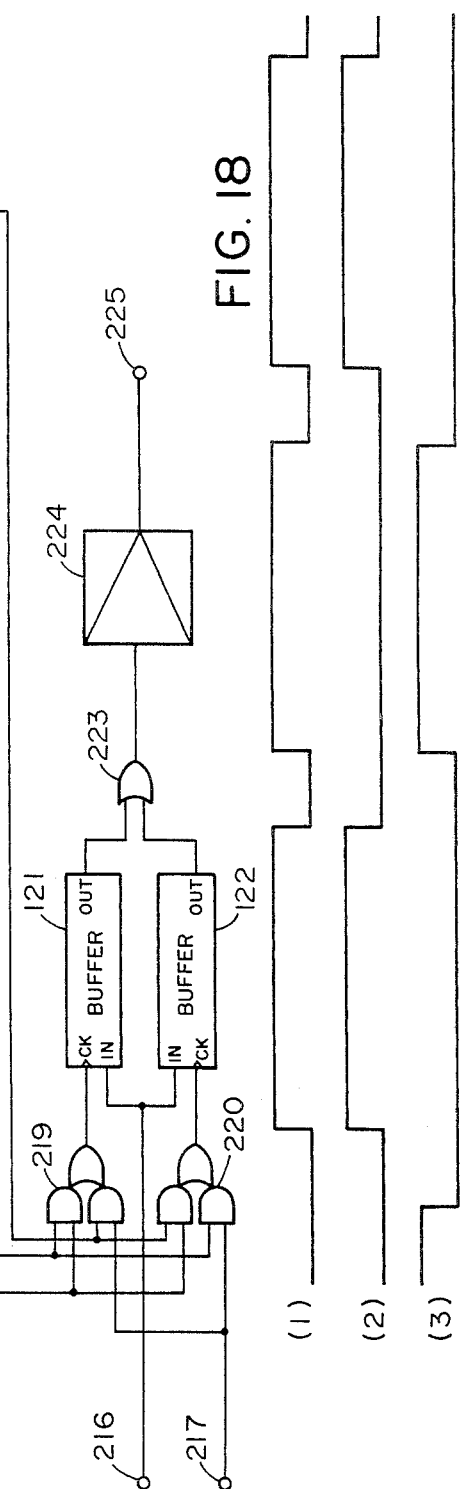
FIG. 18 shows various waveforms for explaining the operation of the circuit shown in FIG. 17.

According to what has been described in the foregoing, formation of the synchronous signal is achieved. Such synchronous signal is further applied to two data buffers 121 and 122. In more detail, FIG. 17 shows an example of the so-called double buffering, in which either one of the two data buffers 121, 122 is used as the input, and the other as the output. The use is done alternately. Various recording input data signals are introduced from the input terminals 216, 217. The synchronous signal is converted into two series signals by the gate circuit 218 to control the clock gate circuits 219, 220 so as to alternately control one of the buffers 121, 122 as the input and the other thereof as the output. Outputs are taken out alternately by the OR circuit 223. An output recording data is produced at the terminal 225 through the amplifying circuit 224, and an image synchronous with the edge of the recording paper is recorded by the head 186. The timings for the recording operations are shown in FIG. 18. In FIG. 18, (1) refers to a synchronous signal, and (2), (3) are signals to be applied to the clock gate circuits 219, 220 by the gate circuit 218. In the above-described embodiment, explanation has been made such that the positions 190-1 and 186-1 are mutually different. However, when a construction is made such that both positions are at the one and same position, Nc become zero (Nc=0), hence the correction memory circuits 205, 211 become unnecessary.

In the recording apparatus as described in the foregoing, a time for the end part of the paper to arrive at a position opposite to a particular position (nozzle position) is calculated and memorized after the rotational drum has reached the reference position and in advance of the recording, and, at the time of the recording, the time information as memorized is read out every time the reference pulse signal is obtained to detect the arrival of the end part of the paper at a predetermined position to thereby control the recording by the nozzle.

Accordingly, since the recording paper can be wound around at an arbitrary position on the rotational supporting member, and the information obtained prior to commencement of the recording is repeatedly used at the time of the recording, even when the end part of the recording paper assumes a wavy form, or it floats off the drum surface, the recording can be started from or stopped at a particular position with respect to the reference position of the rotational supporting member, whereby characters and other images to be recorded on the paper are in no way subjected to deformation.

What we claim is:
1. A recording device, comprising:
 (a) image original mounting means for mounting an image original to be reproduced;
 (b) information reading means to read image original information by scanning the image original on said image original mounting means by a moving member which moves relative to said image original mounting means;
 (c) recording means to record the image original information read by said information reading means onto a recording medium;
 (d) detecting means to detect a forward end position of the image original relative to the scanning direction of the image original by said information reading means, and to form a detection signal; and
 (e) control means to control, in response to the detection signal formed by said detecting means, commencement of recording of said image original information onto said recording medium by said recording means.

2. The recording device as set forth in claim 1, wherein said control means has position detecting means to detect a position of the recording medium.

3. The recording device as set forth in claim 1, wherein said control means comprises data storing means to store therein data for shifting the record starting position.

4. The recording device as set forth in claim 3, further comprising inhibiting means to inhibit the shifting of the recording position by the data stored in said data storing means.

5. The recording device as set forth in claim 1, wherein said information reading means comprises a line sensor, in which a plurality of light receiving elements are arranged in a linear form.

6. The recording device as set forth in claim 5, further comprising second detecting means to detect a position of the image original corresponding to a direction perpendicular to the direction of arrangement of said light receiving elements in said line sensor.

7. The recording device as set forth in claim 5, wherein said detecting means has image original detecting means to detect the image original by an output from said line sensor.

8. A recording device, comprising:
(a) image original mounting means to mount thereon an image original;
(b) image original pressing means to press the image original mounted on said image original mounting means thereonto;
(c) a light member provided on said image original pressing means at a portion opposite to said image original mounting means, said light member being so constructed that it has a different light absorption from that of the image original;
(d) information reading means to read out image element information from the image original mounted on said image original mounting means;
(e) moving means to relatively move said image original and said information reading means;
(f) recording means to record the image element information read out by said information reading means onto a recording medium;
(g) signal forming means to form a notifying signal which notifies the position of the image original; and
(h) control means to control the recording positions of the image element information onto the recording medium by said recording means on the basis of said notifying signal.

9. The recording device as set forth in claim 8, wherein said information reading means has a line sensor, in which light receiving elements are arranged in a linear form.

10. The recording device as set forth in claim 9, wherein said signal forming means has forming means to form a notifying signal which notifies the position of the image original by an output of said information reading means.

11. The recording device as set forth in claim 10, wherein said light member consists of a light absorbing member having a larger light absorption than that of the image original.

12. A recording device, comprising:
(a) image original mounting means to mount thereon an image orignial;
(b) information reading means to read information in the image original by scanning the image original on said image original mounting means;
(c) recording means to record the information read by said information reading means onto a recording member;
(d) instructing means to instruct a region on the image original to be recorded on said recording member out of a plurality of regions on said image original; and
(e) control means to control a position of a marginal space to be provided on said recording member in accordance with the instruction from said instructing means.

13. The recording device as set forth in claim 12, further comprising:
recording instructing means to instruct the recording of the information on the recording member by said recording means; and
determining means to determine a position of the marginal space to be formed on said recording member in accordance with the number of instructions given by said instructing means.

14. A recording device, comprising:
(a) information forming means to form visible information on a recording member;
(b) signal forming means to form an instruction signal to instruct information of the visible information on said recording member;
(c) first marginal space forming means to provide a marginal space at one end of said recording member;
(d) second marginal space forming means to provide a marginal space at another end of said recording member opposite to said one end; and
(e) selecting means to alternately select said first marginal space forming means and second marginal space forming means each time the instruction signal is led out of said signal forming means.

15. The recording device as set forth in claim 14, wherein said first marginal space forming means includes first end part marginal space forming means to form the marginal space at the end part of the recording member in its moving direction.

16. The recording device as set forth in claim 14, wherein said second marginal space forming means includes second end part marginal space forming means to form the marginal space at the end part of the recording member in the direction perpendicular to its moving direction.

17. The recording device as set forth in claim 14, wherein said signal forming means has an instruction switch to be manually operated.

18. The recording device as set forth in claim 14, wherein said selection means has a flip-flop circuit which is applied with said instruction signal.

19. A recording device, comprising:
(a) information means to form visible informations on a recording member;
(b) first marginal space means to provide a marginal space at one end of said recording member in the moving direction thereof;
(c) second marginal space means to provide a marginal space at one end part of said recording member in the direction perpendicular to the moving direction thereof;
(d) signal forming means to form a signal which indicates a size of said recording member; and
(e) selecting means to select either said first marginal space means or second marginal space means in accordance with said size signal.

20. A recording device, comprising:
(a) image original mounting means to mount thereon an image original;
(b) reading means to read information in said image original and to form image element signals;
(c) detecting means to detect the presence of the image original by an output from said reading means;
(d) recording means to record information on a recording medium by the image element signals read by said reading means; and
(e) control means to control the information recording by preventing information recording by said recording means when the presence of the image original is not detected by said detecting means.

* * * * *

UNITED STATES PATENT OFFICE
CERTIFICATE OF CORRECTION

Patent No. 4,325,086          Dated April 13, 1982

Inventor(s) YASUSHI SATO, ET AL.

It is certified that error appears in the above-identified patent and that said Letters Patent are hereby corrected as shown below:

Column 5, line 7, "flipflip" should read --flipflop--;
          line 8, "flipflip" should read --flipflop--;
          lines 30,31, "understand" should read --understood--;
          line 49, "in" should read --is--;
          line 50, "have" should read --has--.

Column 6, line 15, "explanations" should read --explanation--;
          line 50, "operations" should read --operation--.

Column 7, line 34, "flipflip" should read --flipflop--;
          line 47, "shaft" should read --shift--.

Column 8, line 33, "longer" should read --larger--.

Column 9, line 26, add --)-- after "on";
          line 31, after "down" delete "at".

Column 10, line 23, "outputs" should read --output--.

UNITED STATES PATENT OFFICE
CERTIFICATE OF CORRECTION

Patent No. 4,325,086           Dated April 13, 1982

Inventor(s) YASUSHI SATO, ET AL.

It is certified that error appears in the above-identified patent and that said Letters Patent are hereby corrected as shown below:

Column 11, line 15, "100" should read --110--;
lines 48,49, "seleced" should read --selected--.

Column 12, line 56, "liminance" should read --luminance--.

Column 13, line 6, "$100_1$" should read --$\phi_1$--.

Column 14, line 57, "compararors" should read --comparators--.

Column 17, line 64, after "effected" delete "the".

Column 19, line 47, "record" should read --recording--.

Column 21, line 65, Claim 12, "orignial" should read --original--.

Signed and Sealed this

Fourteenth Day of September 1982

[SEAL]

Attest:

Attesting Officer

GERALD J. MOSSINGHOFF

Commissioner of Patents and Trademarks